(12) United States Patent
Matsubayashi et al.

(10) Patent No.: US 7,231,388 B2
(45) Date of Patent: Jun. 12, 2007

(54) SIMILAR DOCUMENT RETRIEVING METHOD AND SYSTEM

(75) Inventors: Tadataka Matsubayashi, Yokohama (JP); Katsumi Tada, Kawasaki (JP); Yoshifumi Sato, Yokohama (JP); Yasuhiko Inaba, Yokohama (JP); Shin'ya Yamamoto, Akashi (JP)

(73) Assignee: Hitachi, Ltd., Tokyo (JP)

( * ) Notice: Subject to any disclaimer, the term of this patent is extended or adjusted under 35 U.S.C. 154(b) by 362 days.

(21) Appl. No.: 10/206,595

(22) Filed: Jul. 29, 2002

(65) Prior Publication Data

US 2003/0101177 A1 May 29, 2003

(30) Foreign Application Priority Data

Nov. 29, 2001 (JP) ............................. 2001-363568

(51) Int. Cl.
*G06F 10/30* (2006.01)
(52) U.S. Cl. ................... 707/5; 707/3; 707/4
(58) Field of Classification Search ............... 707/1–6, 707/100, 104.1
See application file for complete search history.

(56) References Cited

U.S. PATENT DOCUMENTS

| | | | | |
|---|---|---|---|---|
| 5,893,065 A | * | 4/1999 | Fukuchi | 704/500 |
| 6,012,053 A | * | 1/2000 | Pant et al. | 707/3 |
| 6,347,315 B1 | * | 2/2002 | Kiyoki et al. | 707/5 |
| 6,473,754 B1 | * | 10/2002 | Matsubayashi et al. | 707/5 |
| 6,556,992 B1 | * | 4/2003 | Barney et al. | 707/6 |

OTHER PUBLICATIONS

U.S. Appl. No. 09/320,558, filed by T. Matsubayashi et al on May 27, 1999 under the title "Method and System for Extracting Characteristic String, Method and System for Searching for Relevant Document Using the Same, Storage Medium for Storing Characteristic String Extraction Program, and Storage Medium for Storing Relevant Document Searching Program".
D. Harman: Ranking Algorithms, Information Retrieval, Prentice Hall PTR, 1992, pp. 363-389.

* cited by examiner

*Primary Examiner*—Sana Al-Hashemi
(74) *Attorney, Agent, or Firm*—Mattingly, Stanger, Malur & Brundidge, P.C.

(57) ABSTRACT

Similar document retrieving method and system for retrieving similar documents from a document database storing plural documents written in different languages with high accuracy while suppressing retrieval noise even when difference is found in the number of registered documents in dependence on the species of description languages. Statistical information concerning the registration-subjected documents is collected on a language-by-language basis upon registration thereof. Upon retrieval of documents similar to a query document, weights of words extracted from the query document are taken into account and on a language-by-language basis by referencing the statistical information.

22 Claims, 18 Drawing Sheets

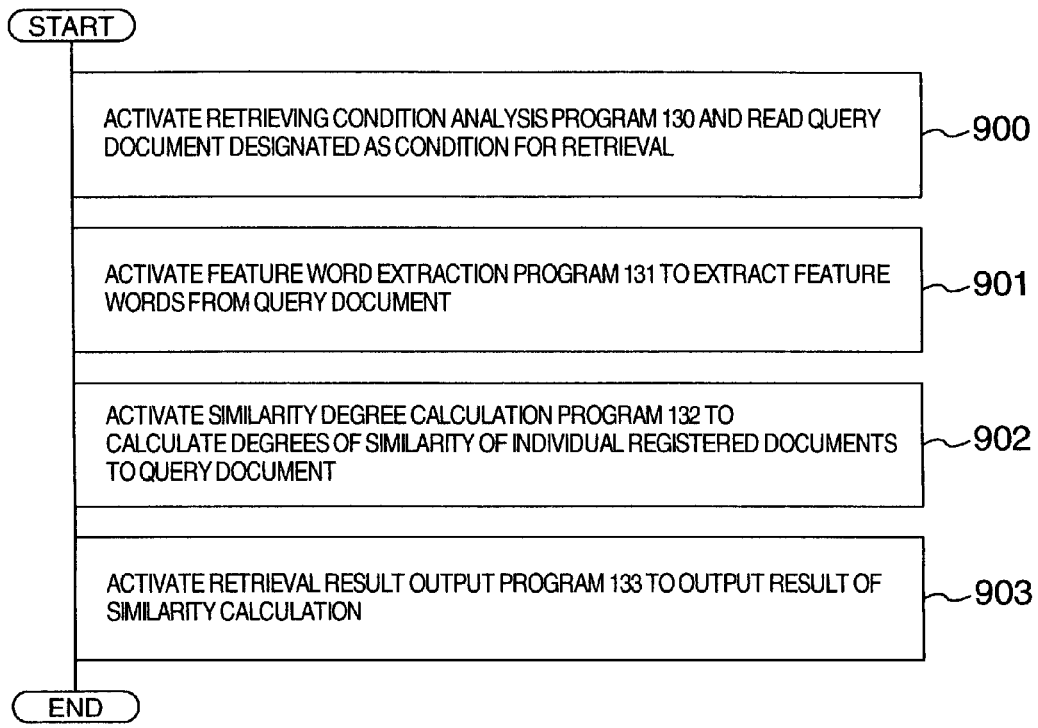
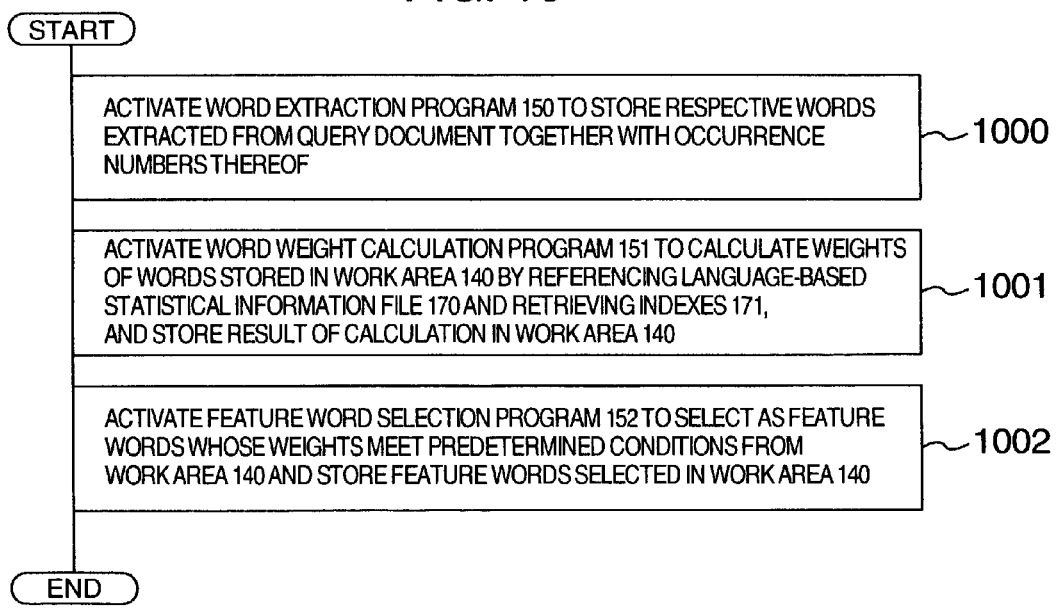

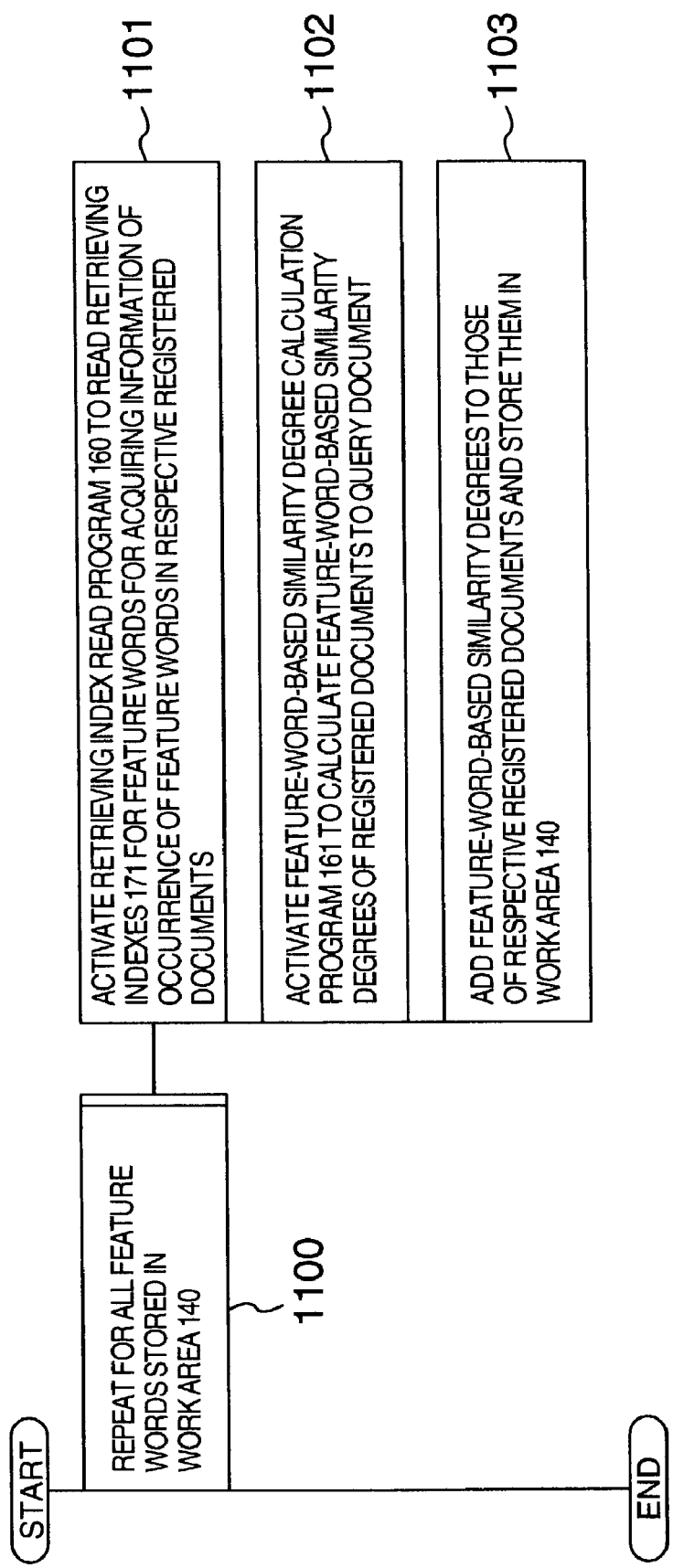

SIMILAR DOCUMENT RETRIEVING METHOD AND SYSTEM

CROSS-REFERENCE TO RELATED APPLICATIONS

This application relates to U.S. patent application Ser. No. 09/320,558 filed by T. Matsubayashi et al on May 27, 1999 under the title "METHOD AND SYSTEM FOR EXTRACTING CHARACTERISTIC STRING, METHOD AND SYSTEM FOR SEARCHING FOR RELEVANT DOCUMENT USING THE SAME, STORAGE MEDIUM FOR STORING CHARACTERISTIC STRING EXTRACTION PROGRAM, AND STORAGE MEDIUM FOR STORING RELEVANT DOCUMENT SEARCHING PROGRAM".

BACKGROUND OF THE INVENTION

1. Field of the Invention

The present invention relates to a method of searching or retrieving from a document database a document or documents having contents similar to those of a document designated by a user (hereinafter referred to as a query document). Further, the present invention is concerned with a document retrieving system for carrying out the above-mentioned method.

A natural language retrieval system is disclosed in W. B. Frakes at el.: INFORMATION RETRIEVAL, Prentice Hall PTR, 1992, D. Harman: PANKING ALGORITHMS, pp. 363–389.

2. Description of Related Art

In recent years, there has arisen an increasing demand for a knowledge management system designed for sharing or communimizing knowledges of individuals belonging to an organization for the purpose of reuse thereof with a view to enhancing efficiency and quality of the businesses or works performed internally of the organization. In particular, in the knowledge management system put to practical use in the enterprise or the like, there is an increasing demand for documentation of experiences of learned men and know-how for sharing and common use as knowledge.

Furthermore, in accompanying with popularization of the internet, experiences of learned men and know-how are now available as the documents in most of the countries of the world, involving an increasing demand for sharing and practical use of them.

Such being the circumstances, endeavor is being paid on development of the facility capable of making available with ease and pertinence the knowledge desired by the user from a large amount of knowledge accumulated internally of an organization.

SUMMARY OF THE INVENTION

In the light of the state of the art briefed above, it is an object of the present invention to provide a similar document retrieving technology for responding to user's designation of a query document having the contents which the user concerns, to thereby search or retrieve a document or documents whose contents are similar to those of the query document from a document database.

Another object of the present invention is to provide a document retrieving technology for making available pertinent information from a large volume of accumulated knowledge.

In view of the above and other objects which will become apparent as the description proceeds, there is provided according to a general aspect of the present invention a method of retrieving a document from a database which method includes a step of extracting a plurality of words contained in a query document designated, a step of collecting a plurality of words contained in a plurality of documents registered previously in the database for thereby creating retrieving indexes on the basis of numbers of times the plural words as collected occur in the previously registered documents, respectively, the retrieving indexes being held in a memory, a step of calculating weights, respectively, of the plural words acquired in the extracting step through comparison with the words included in the retrieving indexes, a step of selecting a plurality of words on the basis of weight values of the plural words as the condition for selection, and a step of calculating degrees of similarity of the plural documents registered previously to the query document on the basis of the plurality of selected words.

The document retrieving method mentioned above may preferably include a step of extracting a predetermined number of words of greater weight for selecting the plural words or excluding words of less significance for selecting the plural words.

Further, a plurality of words contained in the previously registered documents can be selected on a language-by-language basis for creating the retrieving indexes.

BRIEF DESCRIPTION OF THE DRAWINGS

FIG. 9 is a PAD diagram showing a processing procedure executed with a retrieval control program (112) in the system according to the third embodiment of the invention;

FIG. 10 is a PAD diagram showing a processing procedure executed with a feature word extraction program (131) in the system according to the third embodiment of the invention;

FIG. 11 is a PAD diagram showing a processing procedure executed with a similarity degree calculation program (132) in the system according to the third embodiment of the invention;

DESCRIPTION OF THE EMBODIMENTS

Figure 1:
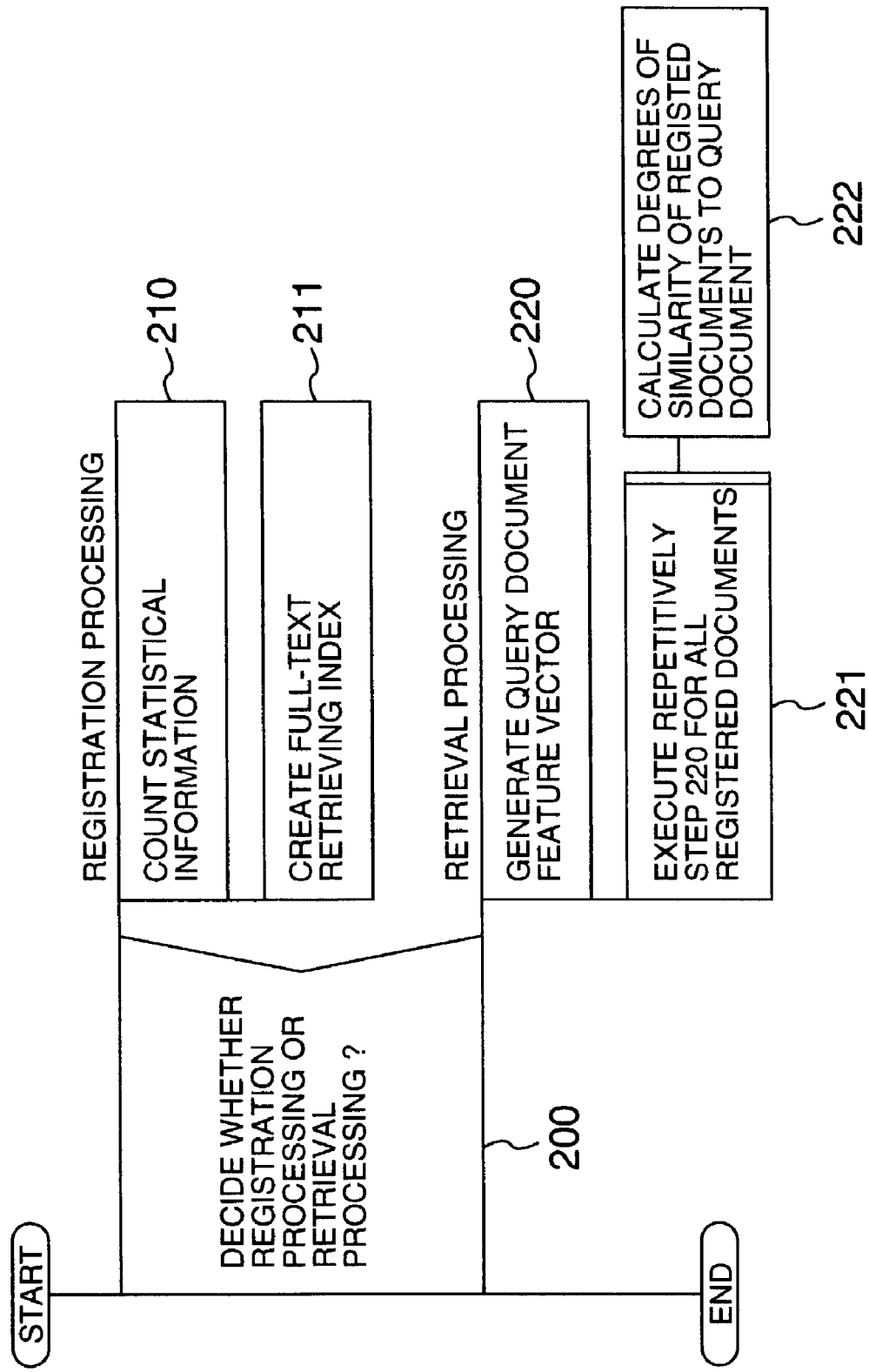
FIG. 1 is a PAD diagram showing generally a processing procedure for document registration and retrieval according to a first embodiment of the present invention.

The present invention will be described in detail in conjunction with what is presently considered as preferred or typical embodiments thereof by reference to the drawings. In the following description, like reference characters designate like or corresponding parts in the several views. At this juncture, it should first be mentioned that the term "document" used herein is the word of convenience. It is intended that the term "document" subsumes "text", "sentence", "character string", etc. Accordingly, the term "document" should never be construed as limiting terms.

FIG. 1 is a PAD diagram (Problem Analysis Diagram) showing generally a processing procedure for a document database according to a first embodiment of the present invention. Referring to FIG. 1, it is first decided in a step 200 whether an input command (i.e., command inputted by a user) is for a registration processing or for a retrieval processing. When it is decided that the input command indicates the registration processing, then processing steps 210 and 211 are executed. On the other hand, when the retrieval processing is commanded, steps 220 to 222 are executed.

In the step 210 included in the document registration processing, statistical information for the document database is counted and stored, which is then followed by a step 211 where full-text retrieving indexes are created for the individual registered documents, respectively.

On the other hand, in the case where a similar document is to be retrieved, the processing step 220 is first executed for thereby creating or generating a query document feature vector for a query document designated as the condition for document retrieval.

In the step 221, the processing in the step 220 is executed repetitively for all the registered documents. In the step 222, degrees of similarity of the individual registered documents to the query document, respectively, are arithmetically determined or calculated.

Figure 2:
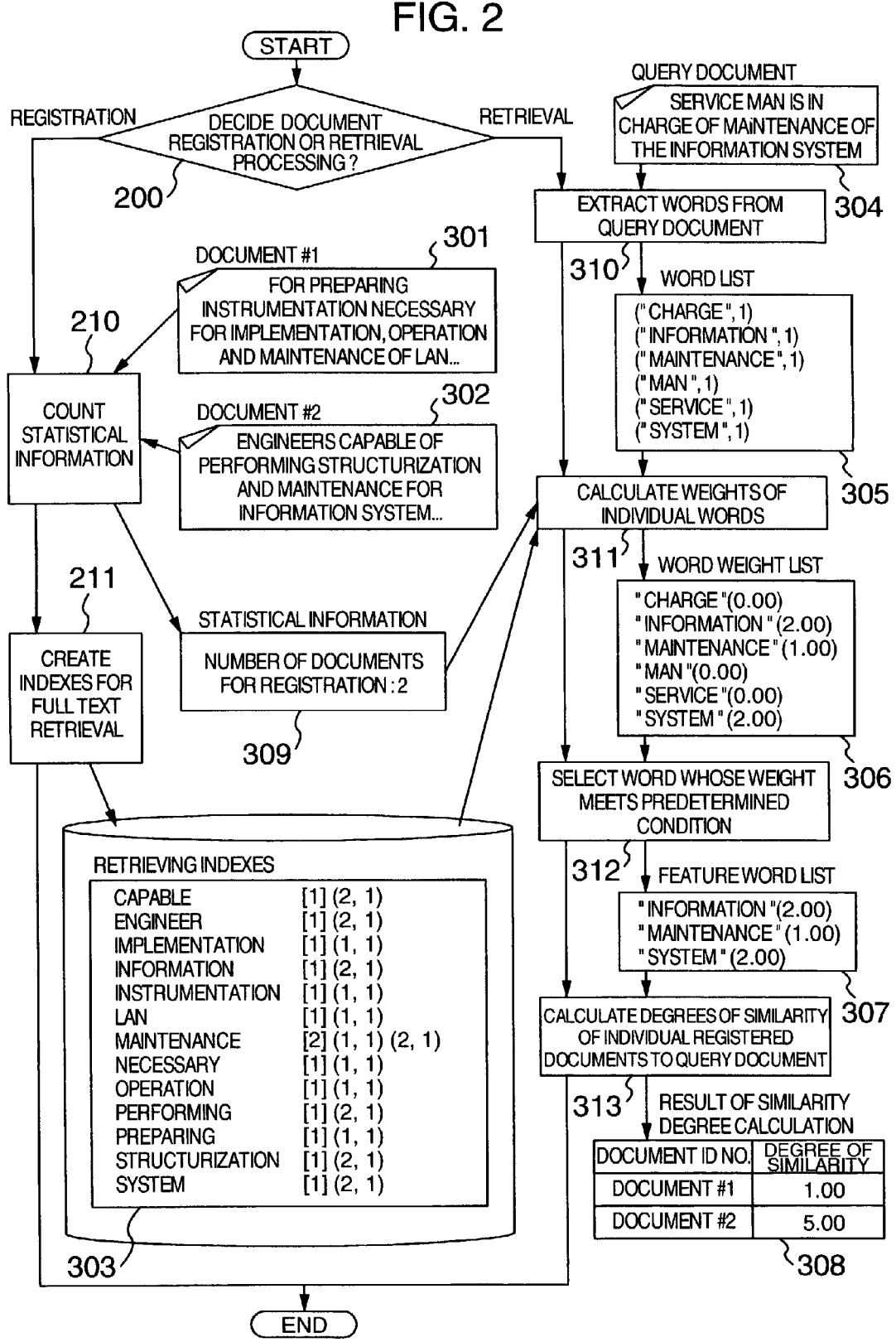
FIG. 2 is a flow chart for illustrating an example of the document registration/retrieval processing procedure according to the first embodiment of the invention.

The processing procedure briefed above will be elucidated more concretely by reference to a flow chart shown in FIG. 2. Referring to FIG. 2 which shows in more concrete an example of the registration/retrieval processing procedure according to the first embodiment of the invention, decision is first made in a step 200 as to whether the processing as requested is the document registration processing or the document retrieval processing. When it is decided in the step 200 that the requested processing is the document registration processing, the steps 210 and 211 are executed. On the other hand, when the processing request is decided as the retrieval processing of a similar document or documents, steps 310 to 313 are executed.

In the step 210 for the document registration processing, the number of documents to be registered in the document database is counted as the statistical information. In the case of the illustrated example now under consideration, it is presumed that there are designated as the documents to be registered a document #1 (301) "For preparing instrumentations necessary for implementation, operation and maintenance of LAN . . . " and a document #2 (302) "Engineers capable of performing structurization and maintenance for information systems . . . ". In other words, two documents 301 and 302 are designated to be registered in the document database. Accordingly, as the statistical information 309, "number of documents for registration: 2" is stored.

Subsequently, in the step 211, full-text retrieving indexes for the documents subjected to the registration are created. In the case of the example now under consideration, a set of retrieving indexes 303 for the documents #1 and #2 to be registered are created. In this conjunction, it is presumed that each of the retrieving indexes 303 is represented in the general form "word [number of documents in which "word" occurs] (document ID number, number of occurrence)". By way of example, the index "system [1] (2, 1)" included in the retrieving indexes 303 means that the number of documents in which the word "system" occurs, i.e., makes appearance, is "1" and that the word "system" occurs once in the registration-subjected document #2.

On the other hand, in the processing for retrieving the similar document(s), steps 310 to 313 are executed. In the following, description will be made on the presumption, only by way of example, that a query document 304 reading "service man is in charge of maintenance of the information system" is inputted as the condition for retrieval. In that case, words are firstly extracted from the query document in the step 310, as a result of which a list of the words (hereinafter referred to as the word list) each combined with the number of times the words make appearance or occur in the query document (hereinafter referred to as the occurrence number) is outputted. In the case of the illustrated example, a word list 305 containing "("information", 1), ("system", 1), ("maintenance", 1) and ("charge", 1) is outputted or derived from the query document 304 "service man is in charge of maintenance of the information system". In this conjunction, the expression "("information", 1)"

represents that the word "information" makes appearance or occurs once in the query document.

In succession, in the step 311, weights of the individual words contained in the word list outputted from the above-mentioned processing step 310 are arithmetically determined or calculated by referencing the statistical information and the retrieving indexes created at the time of the registration, as a result of which a list of word weights (hereinafter referred to as the word weight list) is outputted from the step 311. In the case of the example illustrated in FIG. 2, the weight is arithmetically determined in accordance with the undermentioned expression (1) on the basis of the number of the registered documents (also referred to as the registered document number) acquired by referencing the statistical information 309 and the number of the documents in which the individual words occur as acquired by referencing the retrieving indexes 303, whereby a word weight list 306 containing '"information" (2.00), "system" (2.00), "maintenance" (1.00) and "charge" (0.00)' is outputted. In this case, the expression '"information" (2.00)' indicates that the weight of the word "information" is "2.00". On the other hand, the word "charge" does not occur in the registered documents. Accordingly, the weight of this word "charge" is calculated to be "0.00".

$$IDF = 1 + \log_2 N/n \quad (1)$$

In the above expression, N represents the number of the registered documents while n represents the number of the documents in which the individual words occur or make appearance. In succession, in the step 312, there are selected the word(s) whose weight(s) satisfies a predetermined condition from the word weight list created in the step 311 as the word(s) representing the feature(s) of the query document (hereinafter referred to as the feature word(s)), the selected word(s) being then outputted in the form of a feature word list. In the case of the example now concerned, it is presumed that the word whose weight exceeds "1.00" is to be outputted as the feature word. Thus, the words "information", "maintenance", and "system" which are contained in the word weight list 306 and whose weights exceed "1.00" are extracted as the feature words to be stored in the feature word list denoted by 307. In other words, the words which are of less significance (or low value) have been excluded from the feature words.

Next in the step 313, the degrees of similarity of the individual registered documents to the query document are calculated or arithmetically determined. In the case of the instant example, it is presumed that the undermentioned expression (2) is used for calculating or arithmetically determining the degree of similarity. With this expression (2), the degree of similarity is determined as a sum of products of the weights of the words, the number (occurrence number) of times the word occurs or makes appearance in the query document and the numbers (occurrence numbers) of times the word occurs or makes appearance in the registered documents, respectively. Thus, the degree of similarity of the document #1 is calculated to be "1.00" as indicated by the undermentioned expression (3), while the degree of similarity of the document #2 is determined to be "5.00" as indicated by the undermentioned expression (4). These degrees of similarity are outputted in the form of a list termed the similarity degree calculation result 308.

$$\text{Degree of similarity of between query and registered documents} = \Sigma(\text{weight}) \times \text{all words in query document}(\text{occurrence number in query document}) \times (\text{occurrence number in registered document}) \quad (2)$$

$$\text{Degree of similarity of the document \#1} = 2.00 \times 1 \times 0 + 2.00 \times 1 \times 0 + 1.00 \times 1 \times 1 + 0.00 \times 1 \times 0 = 1.00 \quad (3)$$

$$\text{Degree of similarity of the document \#2} = 2.00 \times 1 \times 1 + 2.00 \times 1 \times 1 + 1.00 \times 1 \times 1 + 0.00 \times 1 \times 0 = 5.00 \quad (4)$$

As a result of the arithmetic processings described above, the document #2 is retrieved because the contents of the document #2 are more similar to the query document than the document #1. In this way, by making use of the statistical information and the occurrence number information of the individual words which make appearance in common to both the query document and the registered documents, it is possible to search and retrieve the document whose contents bear similarity to the query document designated as the condition for retrieval.

In the foregoing, the basic concept underlying the document retrieval according to the present invention has been described. However, the document retrieving procedure described above may suffer a problem, which will be elucidated below.

In the case where search or retrieval for the similar document(s) is performed on a document database which stores a document or documents containing sentences or paragraphs or the like descriptions written in a plurality of different languages such as English, German, etc. (hereinafter this sort of document will be referred to as the plural language coexistent document), there may possibly arise such situation that degree of importance or significance of the word extracted from the query document can not correctly be calculated. In particular, this problem will become more serious when difference is found in respect to the registration number of the documents in dependence on the languages used for description.

Now referring to FIG. 3, problems which may arise when the similar document retrieval is performed for the document database in which the plural language coexistent documents are stored will be explained in more concrete.

Figure 3:
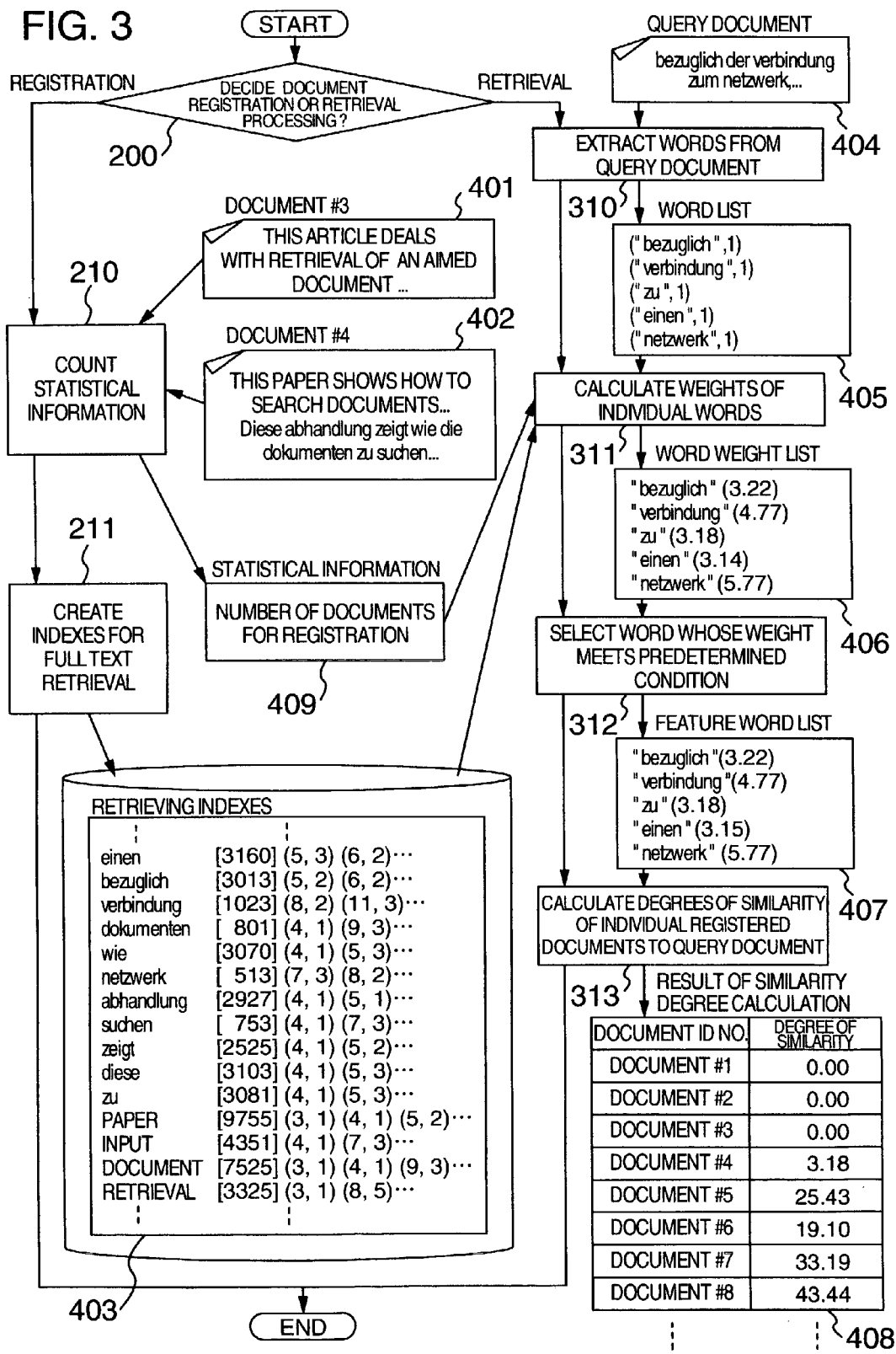
FIG. 3 is a flow chart for illustrating a problem which may arise when the similar document retrieval according to the first embodiment is performed on a document database which stores plural language coexistent documents.

Referring to FIG. 3 which shows a processing procedure for document retrieval performed on a document database storing plural language coexistent document(s), it is presumed that a query document 404 "bezüglich der Verbindung zum Netzwerk, . . . " is designated as the condition for document retrieval, that the document database stores single language documents such as a document #3 "This article deals with retrieval of an aimed document . . . " 401 and plural language coexisting documents such as a document #4 "This article deals with . . . for inputted document . . . Diese Abhandlung zeigt wie die Dokumenten zu suchen" 402 and that "registered document number: 14000" has been provided as the statistical information 409 together with a set of retrieving indexes 403. At this juncture, it should be added that the retrieving index set 403 is scribed in a same format as the retrieving indexes 303 described previously by reference to FIG. 1. In other words, each of the retrieving indexes 403 is represented in the general form "word [number of documents in which "word" occurs] (document ID number, number of occurrence)". By way of example, "Dokumenten [801] (4, 1)" included in the retrieving indexes 403 means that the number of the documents in which the word "Dokumenten" occurs or makes appearance is "80" and that this word occurs only once in the document #4.

Now, referring to FIG. 3, a step 310 is executed for extracting words from the query document 404. As a method of extracting words from English and German texts (i.e., text or document written in English and German), it is conceived that consecutive character strings of alphabets delimited by space, comma, period or the like used as punctuation marks may be extracted, respectively, as the words. As a result of this, a word list 405 containing combinations of the words extracted from the query document and the numbers of occurrence of the words in the query document (i.e., numbers of times the individual words occur or make appearance in the query document) is outputted. In succession, a step 311 is executed, whereby the weights of the individual words contained in the word list 405 created in the step 310 are calculated or arithmetically determined by referencing the retrieving indexes 403 and the statistical information 409 created when the documents have been stored in the document database. As the result of this processing, a word weight list 406 is outputted.

Next, in a step 312, the words whose weights satisfy or meet the predetermined condition are selected as the feature words from the word weight list 406 created in the step 311 to be subsequently outputted in the form of a feature word list 407. In the case of the example now under consideration, it is presumed that the words whose weights not smaller than "2.00" are outputted as the feature words. Accordingly, all the words extracted from the query document, i.e., "bezüglich", "Verbindung", "zu", "einen" and "Netzwerk" are selected to be contained in the feature word list 407. Subsequently, in a step 313, the degrees of similarity which the individual registered documents bear to the query document are calculated. As a result of this, the degree of similarity of the document #3 including none of the words contained in the feature word list 407 is calculated to be "0.00", while the degree of similarity of the document #4 including the word "zu" is calculated to be "3.18" in accordance with the undermentioned expression (5). These similarity values are outputted as the similarity degree calculation result 408.

$$\text{Degree of similarity of the document }\#4=3.22\times1\times0+\\4.77\times1\times0+3.18\times1\times1+3.14\times1\times0+5.77\times1\times0=3.18 \quad (5)$$

As is apparent from the above, the degree of similarity is also assigned to the document #4 which is irrelevant to the contents of the query document, giving rise to a problem.

Embodiment 2

Figure 4:
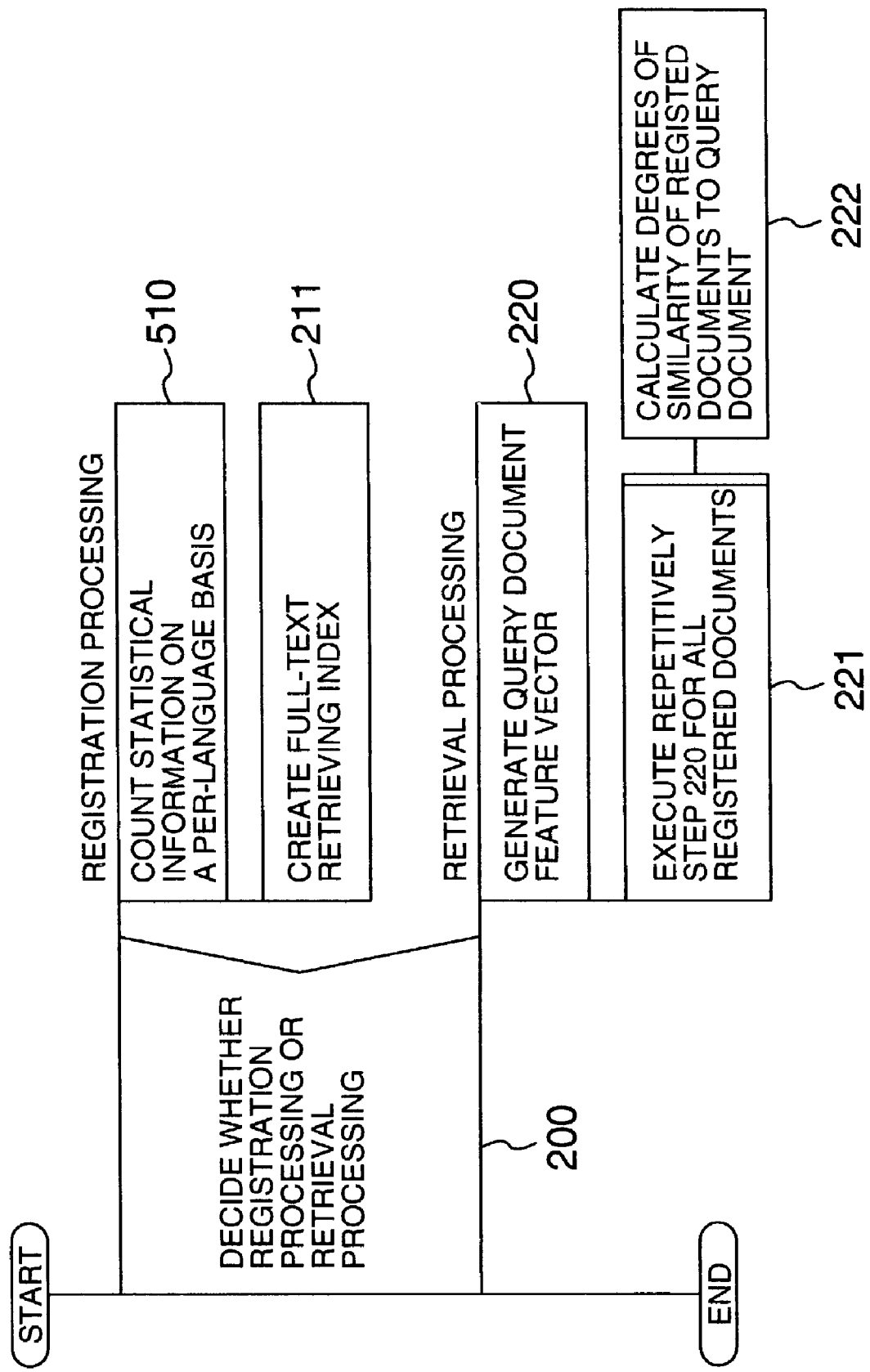
FIG. 4 is a PAD diagram showing generally a document registration/retrieval processing procedure according to a second embodiment of the present invention which can satisfactorily cope with the problem mentioned above.

A second embodiment of the present invention is directed to the document retrieving method and system which can satisfactorily cope with the problem mentioned above. More specifically, for solving the problem mentioned, there is provided according to the teaching of invention incarnated in the second embodiment thereof a language-based statistical information counting step 510 for discriminatively identifying the description language of a registration-subjected document upon registration thereof and counting the statistical information discriminatively on a language-by-language basis (i.e., on a per-language basis) in place of the statistical information counting step 210 (shown in FIG. 1), as is can be seen in a PAD diagram of FIG. 4.

Figure 5:
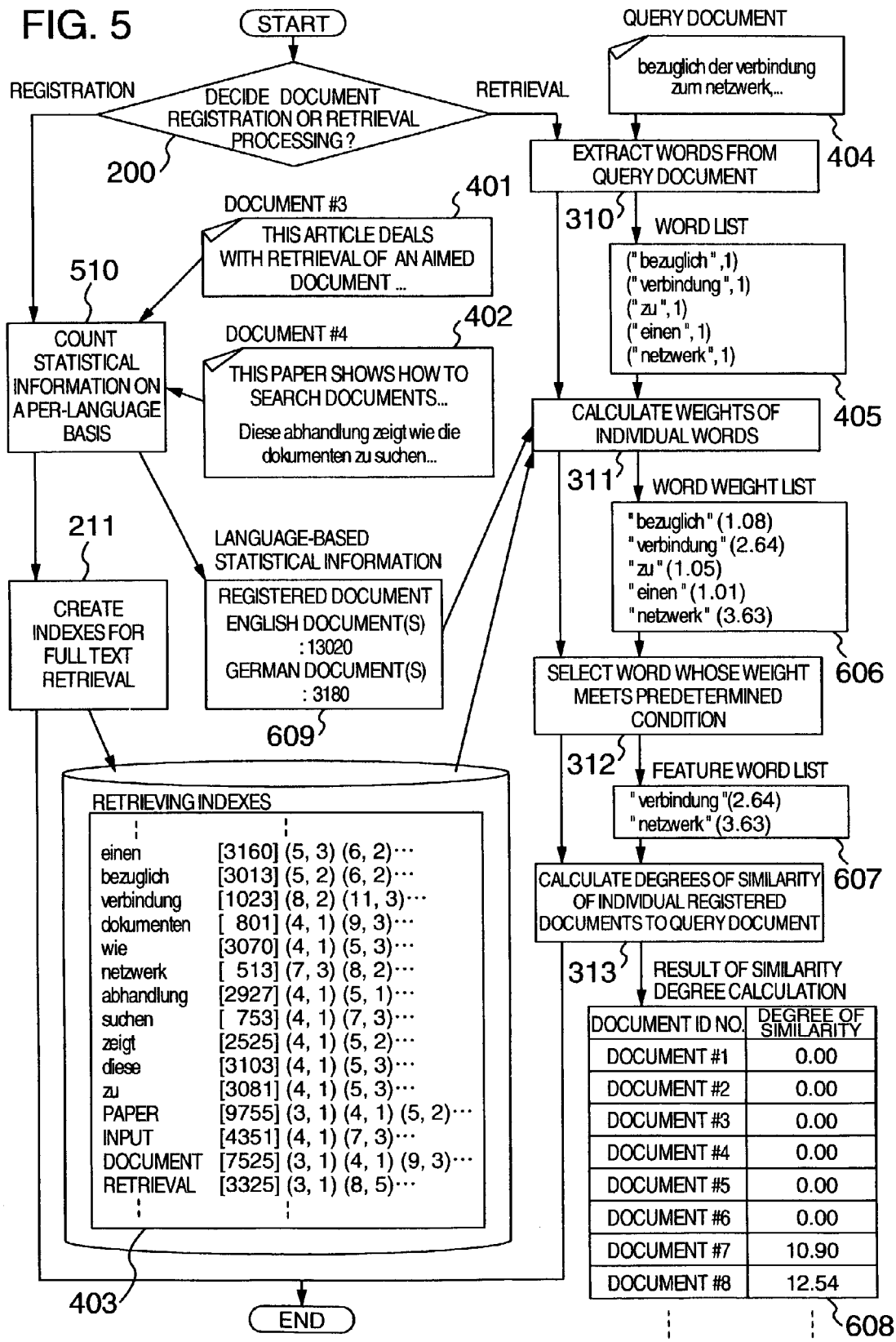
FIG. 5 is a flow chart for illustrating an example of the document retrieval processing procedure according to the second embodiment of the invention which includes a per-language or language-based statistical information counting step.

Now, referring to a flow chart shown in FIG. 5, document retrieval processing procedure which includes the language-based statistical information counting step 510 mentioned above will be described in more concrete. At first, description will be directed to the document registration processing procedure. In the language-based statistical information counting step 510, the statistical information is counted on a per-language basis for the document subject to the registration. By way of example, the document #3 "This article deals with retrieval of an aimed document . . . " 401 shown in FIG. 5 is decided as the English document, while the registered document #4 "This article deals with . . . for inputted document . . . Diese Abhandlung zeigt wie die Dokumenten zu suchen" 402 is decided as an English document and a German document. Thus, the overall decision result "two English documents, one German document" is added to the language-based statistical information 609. As a result of this, information "number of registered documents, English documents: 13020, German documents: 3180" is stored as the language-based statistical information 609. Subsequently, in a step 211, the full-text retrieving indexes are created. The above is the gist of the document registration processing procedure according to the second embodiment of the present invention.

Next, the similar document retrieval processing procedure in the similar document retrieving system according to the second embodiment of the present invention will be described on the presumption that a query document 404 "bezüglich der Verbindung zum Netzwerk, . . . " is inputted as the condition for retrieval. At first, in the step 310 shown in FIG. 5, words are extracted from the query document 404 and the word list 405 is created, as described previously in conjunction with the first embodiment of the invention. Subsequently, for each of the words contained in the word list 405, the number of the registered documents which correspond to the language of the word is acquired on a per-language basis by referencing the language-based statistical information 609 created upon storage or registration of the documents in the document database and at the same time, the number of the documents in which the word concerned occurs or makes appearance is determined by referencing the retrieving indexes 403 (see step 311, FIG. 5). By making use of these information, the weights of the words of concern are calculated to be outputted in the form of a word weight list 606.

In the case of the example now under consideration, the word, e.g. "bezüglich" contained in the word list 405 is obviously a German word. Accordingly, information "3180" is acquired from the language-based statistical information 609 as the number of registered German documents. Additionally, by referencing the retrieving indexes 403, the number of documents in which this word occurs or makes appearance, e.g. "3013" is acquired. By placing these values in the undermentioned expression (6), weight of the word "bezüglich" is calculated to be "1.08" which is then stored in the word weight list 606.

$$IDF=1+\log_2 N/n \quad (6)$$

In the above expression, N represents the number of the registered documents and n represents the number of the documents in which the concerned words make appearance, respectively. In a step 312, the words whose weights meet a predetermined condition are extracted as the feature words, to be subsequently used for the calculation of the similarity degree in a succeeding step 313. In the case of the illustrated example, it is presumed that the words whose weights are not smaller than "2.00" are extracted as the feature words, as in the case of the first embodiment of the invention described hereinbefore by reference to FIG. 3. Accordingly, the words "Verbindung" and "Netzwerk" are extracted as the feature words to be used for calculating the degree of similarity. The result is that the degree of similarity of the documents #3 and #4 is "0.00".

In this manner, the document #4 which is irrelevant to the description of the query document is not outputted as the result of the document retrieval.

As is apparent from the above, by counting the statistical information of the registered documents on a per-language basis (i.e., on a language-by-language basis) and by making use of the statistical information in the weight calculation for retrieving the similar document, it is possible to extract the feature words in conformance with the language-based characteristics. In this manner, noise accompanying the retrieval (hereinafter also referred to as the retrieval noise) can be suppressed to a minimum and thus the result of the similar document retrieval can enjoy high accuracy.

Embodiment 3

Figure 6:
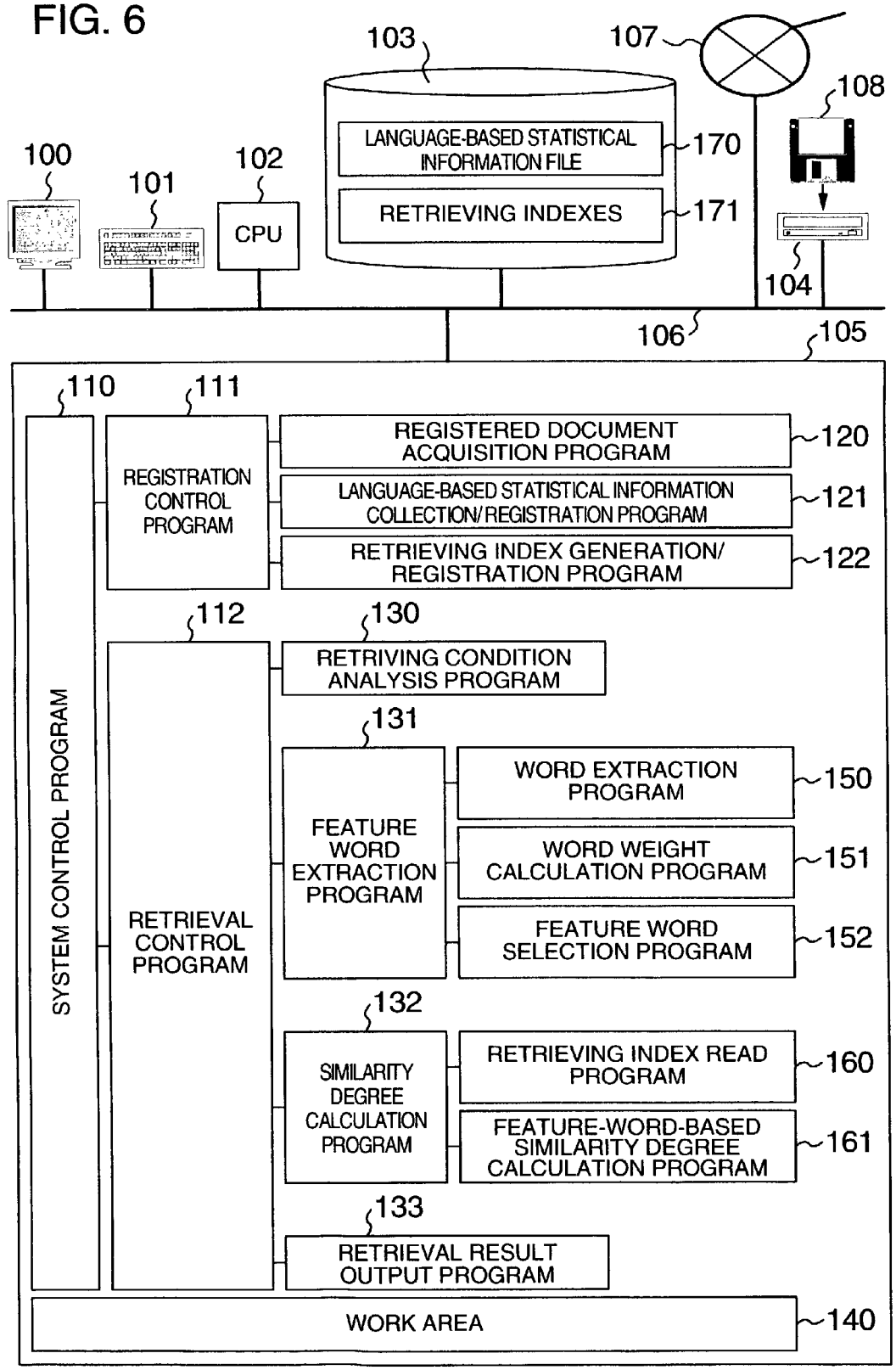
FIG. 6 is a view showing generally a configuration of a similar document retrieving system according to a third embodiment of the present invention.

Next, description will be made of similar document retrieving system and method according to a third embodiment of the present invention. FIG. 6 is a view showing generally a configuration of a similar document retrieving system. Referring to FIG. 6, this retrieving system includes a display device 100, a keyboard 101, a central processing unit (CPU) 102, a magnetic disk drive or unit 103, a floppy-disk drive (FDD) 104, a main memory 105, a bus 106 for interconnecting the components described just above and a network 107 for connecting the present system with other systems or equipment(s).

The magnetic disk unit 103 is one of the secondary storage units and adapted to store therein a language-based statistical information file 170 and a set of retrieving indexes 171. Document designated as the document to be registered (hereinafter also referred to as the registration-subjected document) stored in a floppy disk 108 is read out to be written in the main memory 105 or alternatively in the magnetic disk unit 103 through the medium of the floppy-disk drive (FDD) 104. The main memory 105 stores therein a system control program 110, a registration control program 111, a retrieval control program 112, a registration-subjected document acquisition program 120, a language-based statistical information collection/registration program 121, a retrieving index generation/registration program 122, a retrieving condition analysis program 130, a feature word extraction program 131, a similarity degree calculation program 132, a retrieval result output program 133, a word extraction program 150, a word weight calculation program 151, a feature word selection program 152, a retrieving index read program 160 and a feature-word-based similarity degree calculation program 161. A work area 140 is secured in the main memory 105.

The feature word extraction program 131 is so designed as to be capable of accessing the word extraction program 150, the word weight calculation program 151 and the feature word selection program 152 for activation thereof. The similarity degree calculation program 132 is designed to be capable of accessing the retrieving index read program 160 and the feature-word-based similarity degree calculation program 161 for activation thereof. The registration control program 111 and the retrieval control program 112 are activated by the system control program 110 in response to a command inputted by the user through the medium of the keyboard 101. The registration control program 111 serves for controlling the registration-subjected document acquisition program 120, the language-based statistical information collection/registration program 121 and the retrieving index generation/registration program 122.

On the other hand, the retrieval control program 112 serves for controlling the retrieving condition analysis program 130, the feature word extraction program 131, the similarity degree calculation program 132 and the retrieval result output program 133. At this juncture, it should be mentioned that although the registration control program 111 and the retrieval control program 112 are activated by the command issued in response to the input operation through the keyboard 101 in the system according to the instant embodiment, they may also be so arranged as to be activated in response to a command or an event inputted through the medium of other input unit or via the network 107.

Further, the programs mentioned above may be stored in a storage medium such as the magnetic disk unit 103, the floppy disk 108, MO (Magneto-Optical disk), CD-ROM (Compact Disk Read-Only Memory), DVD (Digital Video Disk) or the like (not shown in FIG. 6), and written in the main memory 105 therefrom through an appropriate drive unit upon execution by the CPU 102.

Furthermore, in the instant embodiment of the invention, it is presumed that the language-based statistical information file 170 and the retrieving indexes 171 are stored in the magnetic disk unit 103. However, it is equally possible to store the language-based statistical information file 170 and the retrieving indexes 171 in such a storage medium as the floppy disk 108, a MO, a CD-ROM, a DVD or the like (not shown in FIG. 6) and write them in the main memory 105 through an appropriate drive unit for utilization thereof. Additionally, these files may be those stored in a storage medium (not shown in FIG. 6) which is connected to other system by way of the network 107 or alternatively these file may be stored in a storage medium which is connected directly to the network 107. Furthermore, in the system according to the instant embodiment of the invention, it is presumed that the registration-subjected document is stored in the floppy disk 108. However, it is equally conceivable to store the registration-subjected document in such a storage medium as the magnetic disk unit 103, a MO, a CD-ROM, a DVD or the like (not shown in FIG. 6) and load them in the main memory 105 therefrom through an appropriate drive unit.

Furthermore, the registration-subjected document may be stored in a storage medium (not shown in FIG. 6) which is connected to other system through the medium of the network 107 or alternatively stored in a storage medium which is connected directly to the network 107.

In the following, description will be directed to a processing procedure executed by the similar document retrieving system according to the instant embodiment of the invention. At first, by reference to a PAD diagram shown in FIG. 7, description will be made of a processing procedure executed through the system control program 110. The system control program 110 firstly analyzes a command inputted through the keyboard 101 in a step 700.

When the analysis in the step 701 results in that the command is to execute the registration, the registration control program 111 is activated in a step 702 to perform the registration of the document. On the other hand, when it is decided in the step 701 that the command is to execute the document retrieval processing, the retrieval control program 112 is activated in a step 703, whereby the processing for retrieving the similar document(s) is executed. The above is the gist of the processing procedure executed by the system control program 110.

Figure 8:
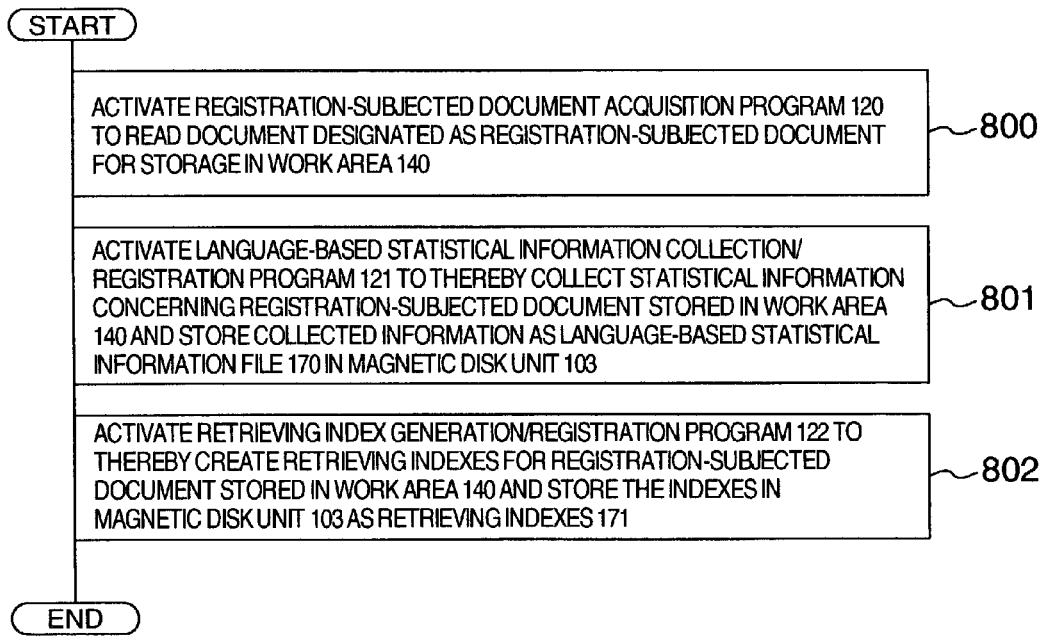
FIG. 8 is a PAD diagram showing a processing procedure executed with a registration control program (111) in the system according to the third embodiment of the invention.

Next, referring to a PAD diagram shown FIG. 8 together with FIG. 6, description will be made of the processing procedure executed through the registration control program 111 which is activated in the step 702 by the system control program 110 as mentioned above. Upon activation of the registration control program 111, the registration-subjected document acquisition program 120 (FIG. 6) is firstly activated in a step 800, whereby the registration-subjected document is read to be stored in the work area 140. Subsequently, in a step 801, the language-based statistical information collection/registration program 121 is activated in a step 801, whereon the statistical information concerning the registration-subjected document stored in the work area 140 in the above-mentioned step 800 is collected on the basis of the description language of the registration-subjected document mentioned above. The statistical information as collected is stored in the magnetic disk unit 103 as the language-based statistical information file 170 (FIG. 6).

At this juncture, it should be mentioned that the discriminative identification of the description language of the registration-subjected document may be made on the basis of a language field to which character code of the characters used in describing the registration-subjected document belongs. Alternatively, the description language may be designated by the user as the attribute information of the registration-subjected document. Further, the description language may be determined on the basis of tag attributes such as SGML (Standard Generalized Markup Language), XML (extensible Markup Language) or the like scribed or contained in the registration-subjected document. In the case where the description language is discriminatively identified on the basis of the language field to which the character code of the characters used in the description of the registration-subjected document belongs, the document in which characters of a given language are contained in a number greater than a predetermined number may be decided as the document of the given language or alternatively a language species ratio of the character codes contained in the registration-subjected document may be calculated to thereby identify a document written in a given language whose language species ratio is not smaller than a predetermined value as the document of that given language. Further, as the further alternative, the document in which characters of a given language make appearance consecutively in the form of a string which contains the characters in a number not smaller than a predetermined number may be identified as the document of that given language.

Subsequently, the retrieving index generation/registration program 122 is activated in a step 802 shown in FIG. 8 for creating the retrieving indexes for the registration-subjected document stored in the work area 140 (FIG. 6). The indexes as created are then stored in the magnetic disk unit 103 (FIG. 6) as the retrieving indexes 171. The foregoing are the gist of the processing procedure executed through the registration control program 111.

Figure 7:
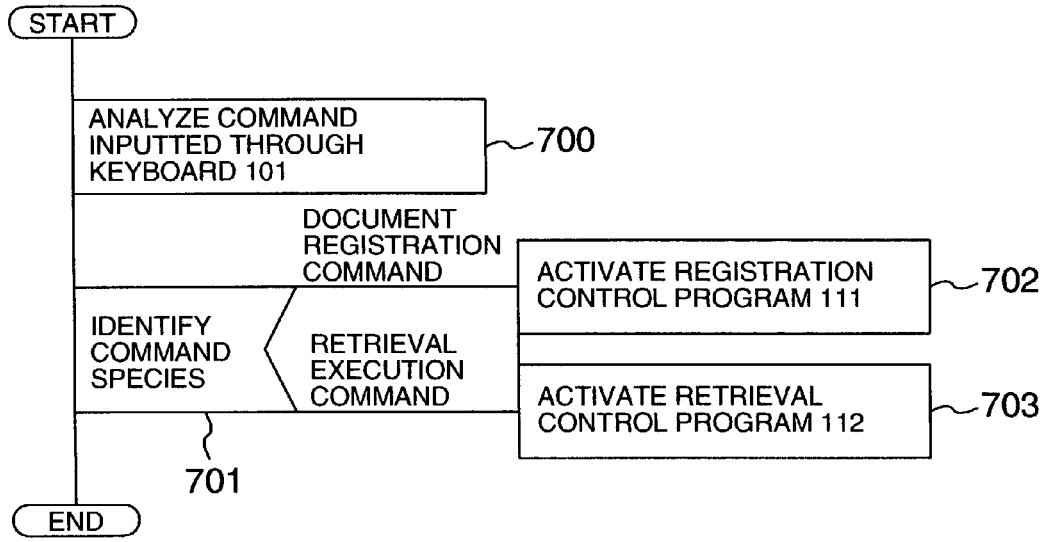
FIG. 7 is a PAD diagram showing generally a processing procedure executed with a system control program (110) in the similar document retrieving system according to the third embodiment of the invention.

Next, referring to a PAD diagram of FIG. 9 together with FIG. 6, description will be directed to the processing procedure executed through the retrieval control program 112 upon activation thereof by the system control program 110 in the step 703 shown in FIG. 7. The retrieval control program 112 firstly activates the retrieving condition analysis program 130 (FIG. 6) in a step 900, reads the query document designated as the condition for retrieval and stores it in the work area 140 (FIG. 6). Then, the retrieval control program 112 activates the feature word extraction program 131 (FIG. 6) in a step 901 to thereby extract the feature words from the query document stored in the work area 140 (FIG. 6) in the step 900 mentioned above.

In succession, the retrieval control program 112 activates the similarity degree calculation program 132 (FIG. 6) in a step 902 to arithmetically determine or calculate the degrees of similarity of the documents registered in the document database (hereinafter also referred to as the registered document) to the query document. Thereafter, the retrieval result output program 133 (FIG. 6) is activated in a step 903, whereby the degrees of similarity of the individual registered documents to the query document as calculated in the step 902 are outputted. The foregoing are the gist of the processing procedure executed through the retrieval control program 112.

Next, referring to a PAD diagram shown in FIG. 10 together with FIG. 6, description will be directed to a processing procedure executed through the feature word extraction program 131 which is activated by the retrieval control program 112 in the step 901 shown in FIG. 9. The feature word extraction program 131 firstly activates the word extraction program 150 (FIG. 6) in a step 1000, extracts words from the query document and counts the occurrence numbers of the words (i.e., the number of occurrences of the respective words in the query document) and then stores the counts in the work area 140.

Subsequently, the word weight calculation program 151 is activated in a step 1001 for arithmetically determining or calculating the weights of all the words stored in the work area 140 in the step 1000 by referencing the language-based statistical information file 170 and the retrieving indexes 171 (FIG. 6), the result of the calculation being then stored in the work area 140 (FIG. 6). In a step 1002, the feature word selection program 152 is activated for selectively reading from the work area 140 as the feature words the words whose weights are not smaller than a predetermined value designated as the condition for retrieval, the selected words being then stored in the work area 140. At this juncture, it should be mentioned that although the weight values of the words are presumed to be designated as the condition for selecting the feature word, it should be understood that the retrieving condition may be described in a system setup file (not shown in FIG. 6) or alternatively designated with environment variables. The foregoing are the gist of the processing procedure executed through the feature word extraction program 131.

Now, referring to a PAD diagram shown in FIG. 11 together with FIG. 6, description will be made of a processing procedure executed through the similarity degree calculation program 132 which is activated by the retrieval control program 112 in the step 902 shown in FIG. 9. In the similarity degree calculation program 132, steps 1101 to 1103 are repetitively executed for all the feature words extracted from the query document via the feature word extraction program 131 in the step 901 shown in FIG. 9 (step 1100). At first, the retrieving index read program 160 (see FIG. 6) is activated in a step 1101 to read the retrieving indexes 171 for the feature words selected in the above-mentioned step 1100 to thereby acquire the occurrence information of the selected feature words in the individual registered documents, respectively.

Subsequently, the feature-word-based similarity degree calculation program 161 (see FIG. 6) is activated in a step 1102 to thereby arithmetically determine or calculate the degree of similarity of each registered document to the query document on the basis of the feature words selected in the step 1100 mentioned above. (Hereinafter, the degree of similarity mentioned above will also be referred to as the feature-word-based similarity degree.) Subsequently, in the step 1103, the feature-word-based similarity degrees of the individual registered documents as calculated in the step 1102 are added to the degrees of similarity of all the registered documents for storage in the work area 140. The above are the gist of the processing procedure executed with the similarity degree calculation program 132.

Figure 12:
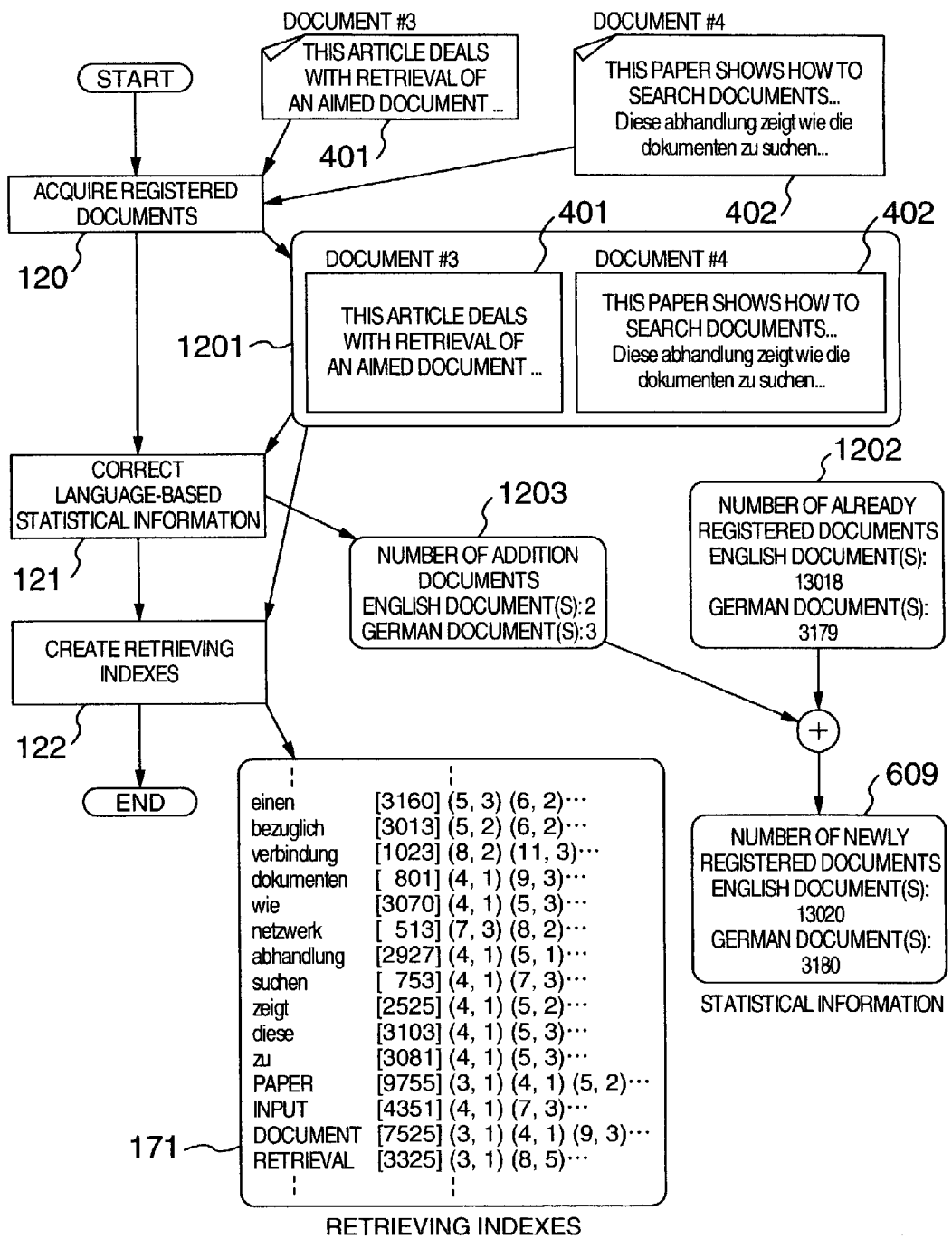
FIG. 12 is a flow chart for illustrating generally a document registration processing in the system according to the third embodiment of the invention.

Next, referring to FIGS. 12 to 15, description will be made in concrete of the processing procedures in the similar document retrieving system according to the third embodiment of the present invention. At first, referring to FIG. 12, description will be directed to the document registration processing in the similar document retrieving system according to the third embodiment of the present invention. FIG. 12 shows processing procedure in a flow chart in the case where a document #3 "This article deals with retrieval of an aimed document . . . " and a document #4 "This article deals with . . . for inputted document . . . Diese Abhandlung zeigt wie die Dokumenten zu suchen" have been registered in the document database.

Firstly, the registered document acquisition processing 120 (FIG. 6) is executed to read the documents #3 and #4 which are then stored in the work area 140 (in a step 1201). Subsequently, the language-based statistical information for the registration-subjected documents #3 and #4 is collected, respectively (step 121). In the case of the example illustrated in the figure, the description language of the document #3 is English while the document #4 is written in English and German. Accordingly, as the statistical information 1203, there is created "number of addition documents, English document: 2, German document: 1". The statistical information 1203 (number of addition English documents and German document) created through the instant processing is added to the statistical information 1202 of the already registered documents and new statistical information 609 is outputted to be subsequently stored in the form of the language-based statistical information file 170 (see FIG. 6).

In succession, the retrieving index generation/registration processing 122 is executed to create or generate the retrieving indexes for the registration-subjected documents #3 and #4 held in the work area 140 (step 122 in FIG. 12). The created indexes are then stored as the retrieving index file 171 (FIG. 6). The foregoing are the gist of the document registration processing in the similar document retrieving system according to the instant embodiment of the invention.

Next, referring to FIG. 13, description will be made of the similar document retrieval processing executed in the similar document retrieving system according to the third embodiment of the invention. It is assumed, by way of example only, that a query document 404 "bezüglich der Verbindung zum Netzwerk, . . . " is inputted. The retrieving condition analysis processing 130 (FIG. 6) is firstly executed and the query document designated as the condition for retrieval is acquired to be stored in the work area 140 (see FIG. 6).

In succession, the feature word extraction processing 131 is executed. By making reference to the language-based statistical information file 170 and the retrieving indexes 171 generated in the document registration processing described hereinbefore, feature words are extracted from the query document 1301 held in the work area 140 to be stored again in the work area 140 in the form of a feature word list 607. Subsequently, the similarity degree calculation processing 132 (also see FIG. 6) is executed. More specifically, the retrieving indexes 171 created in the document registration processing described hereinbefore are read out for thereby calculating the degrees of similarity of the individual registered documents to the query document, as a result of which the similarity degree calculation result 608 is outputted. The foregoing are the gist of the similar document retrieval processing procedure carried out in the similar document retrieving system according to the instant embodiment of the present invention.

Next, referring to FIG. 14, description will be made of the feature word extraction processing 131 in the similar document retrieval processing procedure shown in FIG. 13. It is assumed, by way of example only, that a query document 1301 "bezüglich der Verbindung zum Netzwerk, . . . " held in the work area 140 is inputted. In the first place, the word extraction processing 150 is executed, whereby words are extracted from the query document 1301 held in the work area 140 to be again stored therein in the form of a word list 1401 containing "(bezüglich", 1), ("Verbindung", 1), ("zu", 1) . . . ". At this juncture, the expression ("bezüglich", 1) means that the word "bezüglich" occurs once in the query document. For extracting the words, consecutive character strings punctuated by space, comma or the like punctuation marks may be extracted as the words, respectively.

In succession, the word weight calculation processing 151 (also see FIG. 6) is executed. More specifically, by referencing the language-based statistical information file 170 and the retrieving indexes 171 created by the document registration processing described hereinbefore, the weights of the individual words contained in the word list 1401 are arithmetically determined or calculated to be subsequently stored in the work area 140 in the form of a word weight list 1402. In the case of the instant example, the expression "bezüglich (1.08)" indicates that the weight of the word "bezüglich" is "1.08". At this juncture, it should be mentioned that although the weight of the word of concern is arithmetically determined in accordance with the expression (6) mentioned hereinbefore, it should be understood that any other appropriate weight calculation formula may be employed to this end.

At this juncture, it should be added that although it is presumed that the language species in the language-based statistical information files 170 are discriminatively identified on the basis of the character codes of the individual words extracted through the word extraction processing 150, it should be understood that the language species may be discriminated on the basis of the values of language species ratios of the character codes contained in the query document 2100 or on the basis of the consecutive occurrence number of the character code of a given language or alternatively the language species may be designated as the condition for retrieval or in the system setup file (not shown in FIG. 1) or alternatively as the environment variables or the like. In this manner, English alphabetic character strings such as name of organization, name of a product and others which make appearance in a document written, for example, in German can be handled as German words.

In succession, the feature word selection processing 152 (also see FIG. 6) is executed. More specifically, the word weight list 1402 stored in the work area 140 through the word weight calculation processing 151 mentioned previously is read out for thereby extracting the words whose weights meet the predetermined condition as the feature words which are then placed in the work area 140 in the form of the feature word list 607. In the case of the example illustrated in FIG. 14, it is presumed, by way of example, that the word whose weight is not smaller than "2.00" meets the condition which allows the word to be extracted as the feature word. Consequently, ""Verbindung" (2.64)" and ""Netzwerk" (3.63)" are extracted from the word weight list 1402 as the feature words and stored in the feature word list 607.

In the foregoing, the gist of the feature word extraction processing procedure carried out by the similar document retrieving system according to the third embodiment of the invention has been described. In this conjunction, it should be added that in the feature word selection processing 152 illustrated in FIG. 14, the condition for allowing the word to be extracted as the feature word is set such that the weight thereof is not smaller than "2.00". However, the invention is not restricted thereto. For example, the condition for the word extraction may be set such that "predetermined number of words be selected in the descending order of the weights thereof". Furthermore, these conditions may be combined for use. Additionally, different conditions may be adopted on a language-by-language basis.

Figure 13:
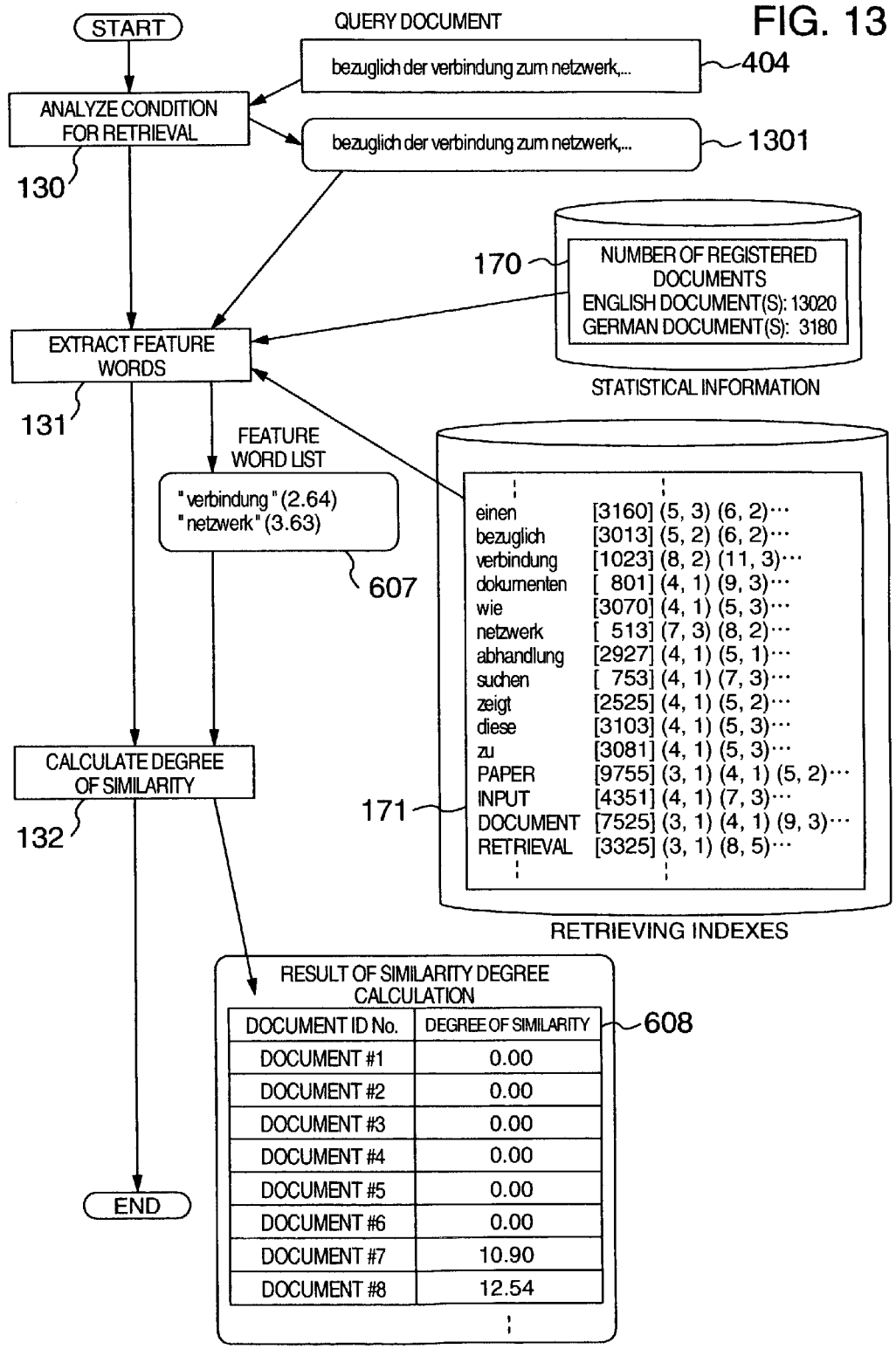
FIG. 13 is a flow chart for illustrating generally a similar document retrieval processing in the system according to the third embodiment of the invention.
Figure 14:
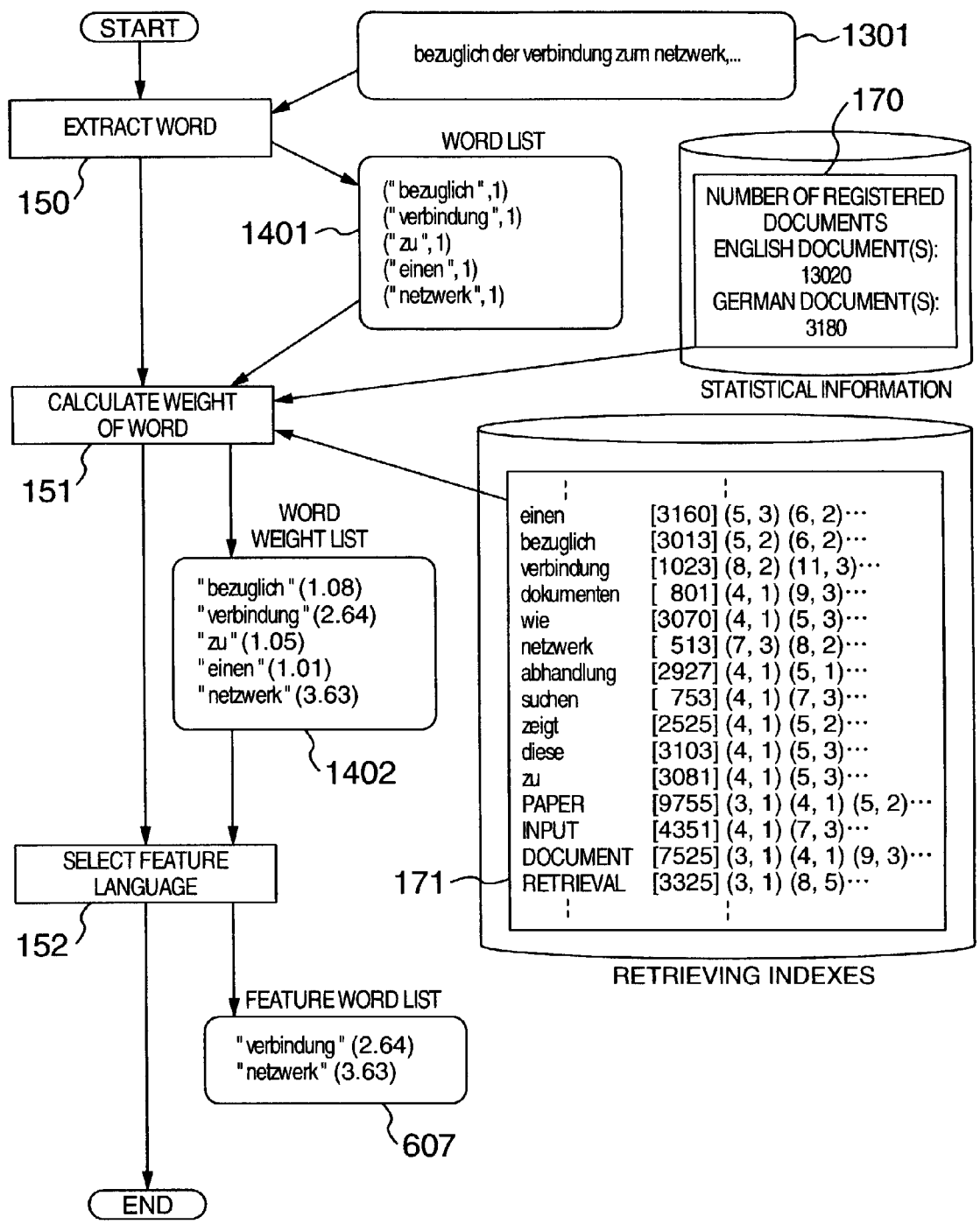
FIG. 14 is a flow chart for illustrating a feature word extraction processing in the similar document retrieval processing procedure according to the third embodiment of the invention.
Figure 15:
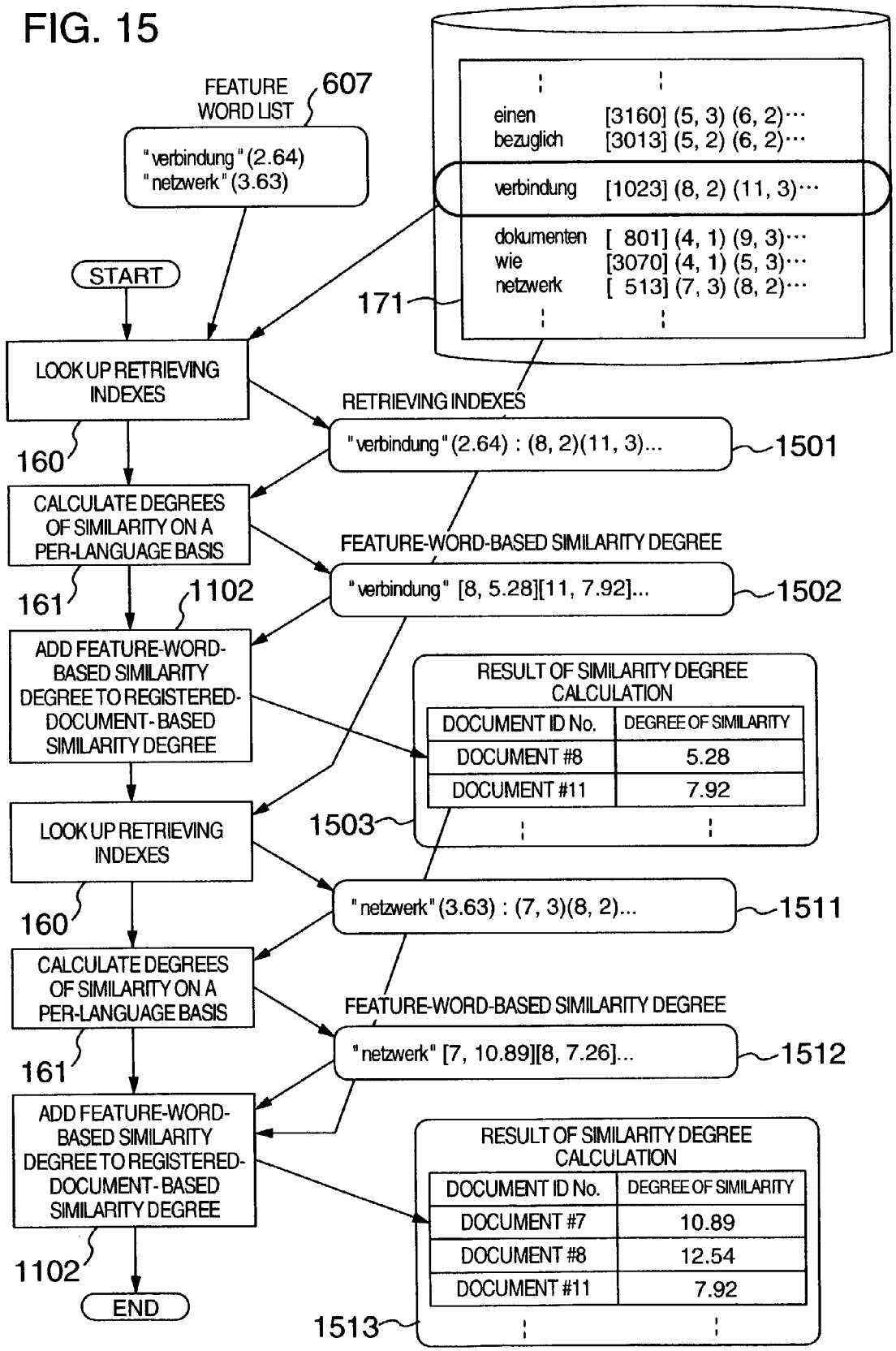
FIG. 15 is a flow chart for illustrating generally a similarity degree calculation processing in the similar document retrieval processing procedure according to the third embodiment of the invention.

Next, referring to FIG. 15, description will be directed to the similarity degree calculation processing 132 in the similar document retrieval processing procedure illustrated in FIG. 13 on the assumption, by way of example only, that the feature word list 607 containing '"Verbindung" (2.64)' and '"Netzwerk" (3.63)' and held in the work area 140 is inputted. At first, a retrieving index look-up processing 160 (equivalent to the retrieving index read program 160 shown in FIG. 6) is executed, whereby the word "Verbindung" contained in the feature word list 607 is selected and the retrieving index 1501 concerning this word is stored in the work area 140.

Subsequently, the feature-word-based similarity degree calculation processing 161 (also see FIG. 6) is executed. To this end, the retrieving index 1501 concerning the word "Verbindung" is read out, whereupon the degrees of similarity of the individual registered documents to the query document are arithmetically determined or calculated on the basis of this word ("Verbindung"). The result of calculation is stored in the work area 140 as the feature-word-based similarity degrees 1502. Incidentally, it is presumed that the expression (2) mentioned hereinbefore is used as the expression for calculating the feature-word-based similarity degree. In succession, the registered-document-based similarity degree calculation processing 1102 is executed, whereby degree of similarity of each document is calculated. In the case of the example illustrated in FIG. 15, the feature-word-based similarity degree 1502 based on the word "Verbindung" is for the processing of the first word. Accordingly, the feature-word-based similarity degree 1502 is outputted as a document-based similarity degree 1503.

Next, for the second word "Netzwerk" contained in the feature word list 607, the retrieving index look-up processing 160 (equivalent to the program 160 shown in FIG. 6), the feature-word-based similarity degree calculation processing 161 and the registered-document-based similarity degree calculation processing 1102 are carried out. As a result of this, the document-based similarity degree 1513 is stored in the work area 140.

As is apparent from the foregoing, in the similar document retrieving system according to the third embodiment of the invention, the statistical information derived by counting the number of the registered documents on a language-by-language basis (i.e., on a per-language basis) is made use of. By virtue of this feature, the degrees of significance or importance can correctly be determined for each of the words extracted from the query document. Thus, the word of high significance or importance can be extracted as the feature word, which ultimately results in that the similar document retrieval can be realized with high accuracy without being accompanied with any appreciable retrieval noise. Incidentally, the foregoing description has been made on the presumption that the subjects for registration and query are documents. However, it goes without saying that they may be sentences or character strings. Accordingly, the term "document" should never be interpreted in the strict sense. Furthermore, although it has been presumed that the expression (2) is employed for arithmetically determining or calculating the degree of similarity on a language-by-language basis (i.e., on a per-language basis), the present invention is never restricted thereto. It should be understood that any other appropriate formula can be used to this end. Besides, it has been presumed that the word extraction processing is realized by extracting the string of consecutive characters delimited by punctuation such as space, comma and the like. It should however be appreciated that any other appropriate word extracting methods can be adopted substantially to the same effect. By way of example, there can be conceived a word extracting method based on the syntactic analysis for which a morphological analysis is adopted or alternatively the character string extracted by using the boundary probability of consecutive character string composed of n characters (hereinafter referred to as n-gram) may be used as the word. Of course, any other suitable word extracting method can be resorted to. Thus, it will be apparent that the similar document can be retrieved in similar manner even in the case where the query document is not written in German.

Further, although the foregoing description has been made on the presumption that the documents stored in the document database are German documents and English documents, it is selfexplanatory that the similar document retrieval can equally be realized even in the case where documents written in three or more different languages are stored in the document database. Furthermore, in the foregoing, no description has been made as to the types or species of the knowledge management system. However, it can readily be appreciated that the index may be created per word extracted from the registration-subjected document or alternatively "n-gram" may be extracted from the registration-subjected document to thereby create the index per extracted "n-gram" (i.e., on an extracted "n-gram" basis).

Embodiment 4

A fourth embodiment of the present invention will now be described. This embodiment is directed to the similar document retrieval in which the statistical information concerning the whole document database is made use of for calculating the degree of similarity of the registered document(s) to the query document instead of the language-based statistical information (per-language statistical information) described hereinbefore. By way of example, the number of all the registered documents of the document database is made use of instead of the number of the per-language registered documents. More specifically, in the similar document retrieval according to the instant embodiment of the invention, the feature word extracted by using the language-based statistical information is assigned with the weight calculated by using the statistical information of the whole document database, whereon the resulting weight is made use of for calculating the degree of similarity. Thus, with the concept of the invention incarnated in the instant embodiment, the similar document retrieval can be realized with high accuracy even when the query document is described in plural different languages regardless of deviation or difference in the number of the registered documents in dependence on the species of the languages in which the registered documents are written.

Figure 16:
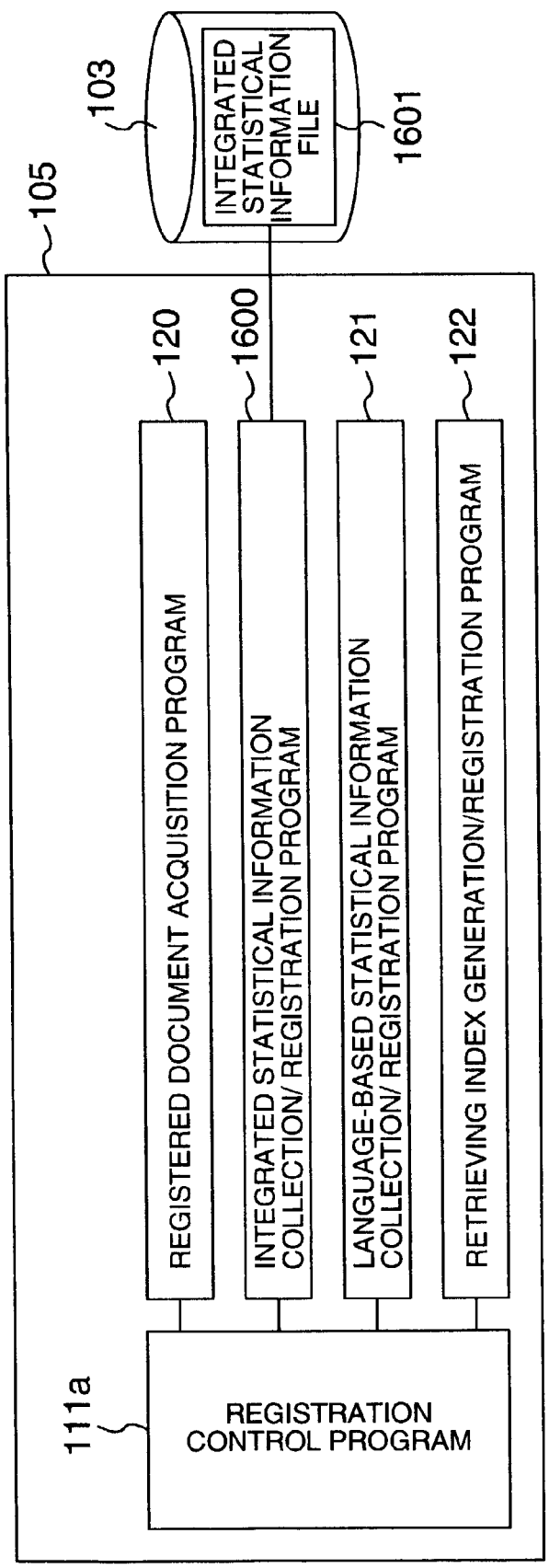
FIG. 16 is a view showing a structure of a registration control program (111a) according to a fourth embodiment of the present invention.
Figure 17:
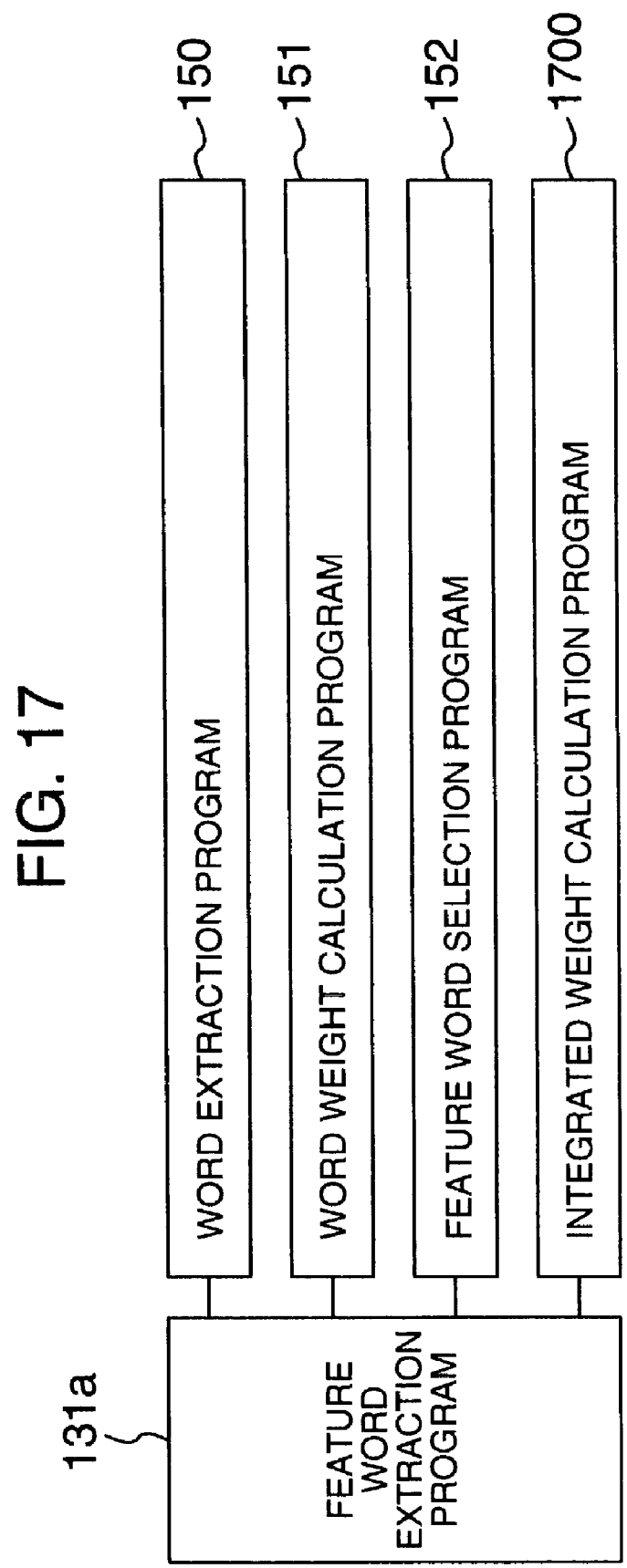
FIG. 17 is a view showing a structure of a feature word extraction program (131a) according to the fourth embodiment of the invention.
Figure 18:
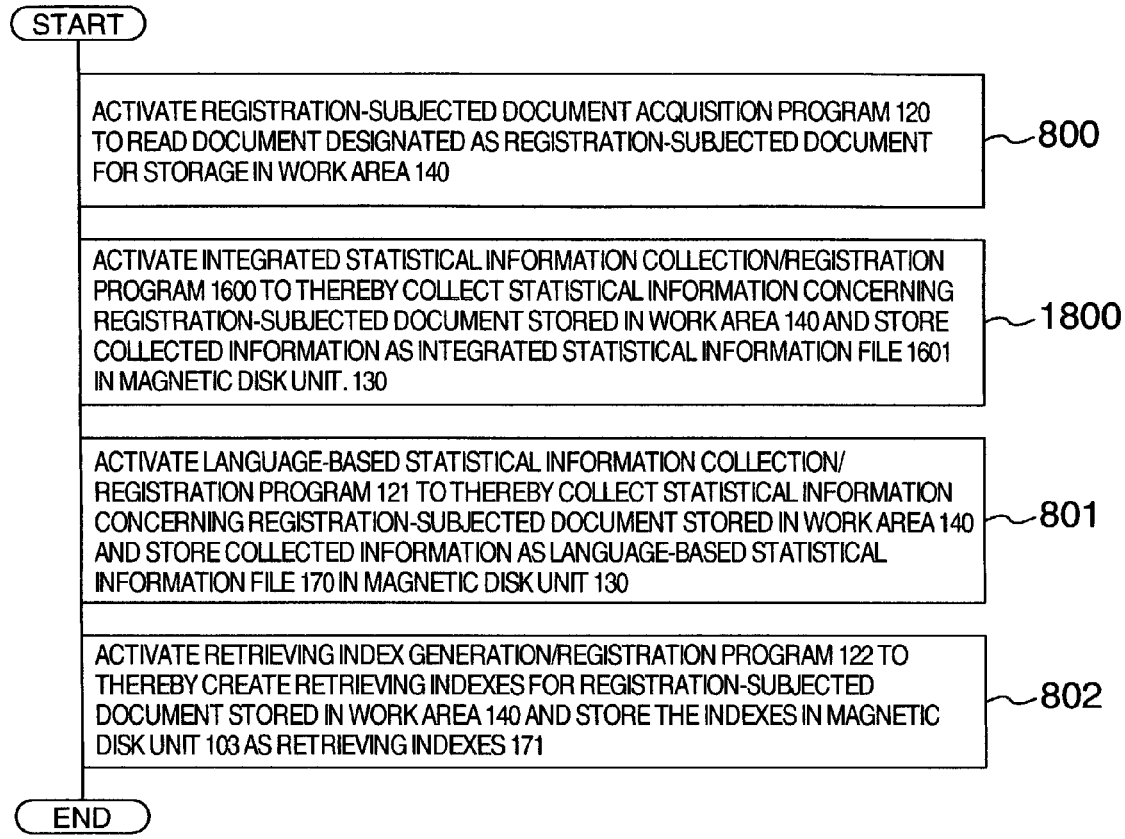
FIG. 18 is a PAD diagram showing a processing procedure executed with the registration control program (111a) according to the fourth embodiment of the invention.

The similar document retrieving system according to the instant embodiment of the invention is implemented in a system configuration substantially similar to that shown in FIG. 6 except for the structures of the registration control program 111 and the feature word extraction program 131, respectively. In the similar document retrieving system now under consideration, an integrated statistical information collection/registration program 1600 is added to the registration control program 111a as shown in FIG. 16 while an integrated weight calculation program 1700 is added to the feature word extraction program 131*a* as shown in FIG. 17. Now, referring to FIG. 18, description will be made of the processing procedure of the registration control program 111*a* which differs from the registration control program 111 shown in FIG. 6. The registration control program 111*a* differs from the registration control program 111 (FIG. 8) in that a step 1800 is additionally provided between the steps 800 and 801 to hold the statistical information for the whole document database.

In the step 1800, an integrated statistical information collection/registration program 1600 is activated, whereon the statistical information concerning the registration-subjected document stored in the work area 140 in the step 800 is collected to be stored in the form of an integrated statistical information file 1601. The foregoing are the gist of the processing procedure of the registration control program 111*a* in the similar document retrieving system according to the fourth embodiment of the invention.

Figure 19:
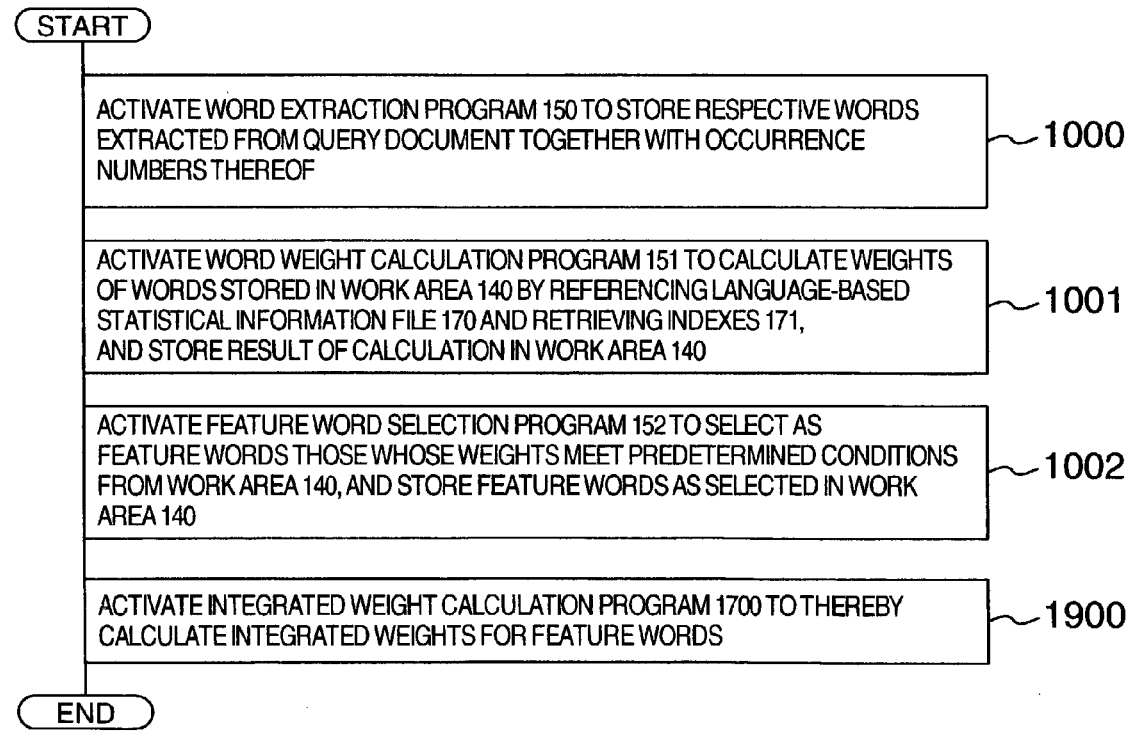
FIG. 19 is a PAD diagram showing a processing procedure executed with a similarity degree calculation program (132a) according to the fourth embodiment of the invention.

Next, referring to FIG. 19, description will be made of the processing procedure of the feature word extraction program 131*a* which differs from the feature word extraction program 131 shown in FIG. 10. The feature word extraction program 131*a* differs from the feature word extraction program 131 (FIG. 10) in that a step 1900 is additionally provided in succession to the step 1002 of calculating the weights of individual feature words by using the statistical information for the whole document database. In the step 1900, the integrated weight calculation program 1700 is activated, whereon the integrated weights for the individual feature words are arithmetically determined or calculated. The above are the gist of the processing procedure of the feature word extraction program 131*a* in the similar document retrieving system according to the fourth embodiment of the invention.

Figure 20:
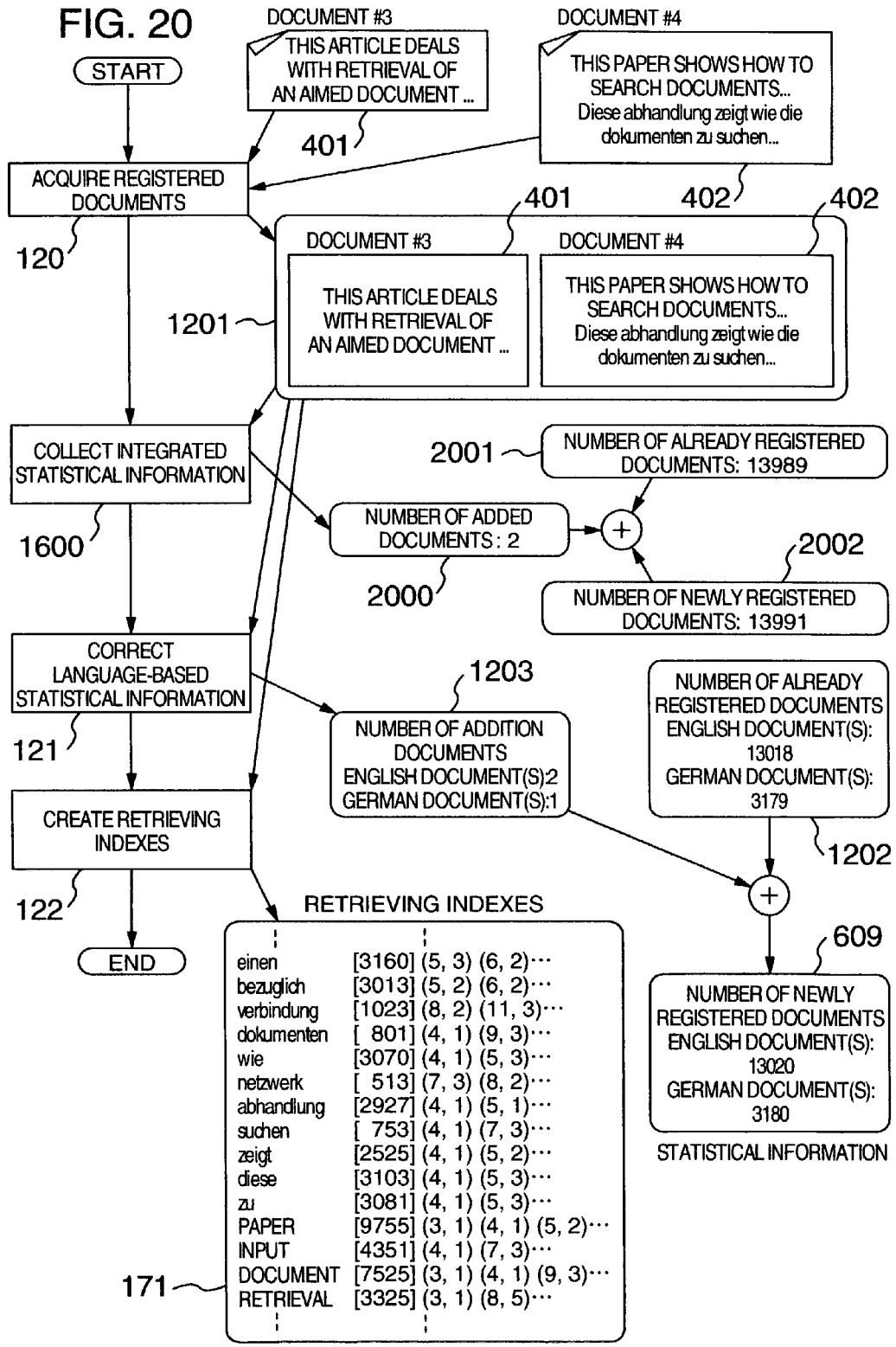
FIG. 20 is a view flow chart for illustrating generally a document registration processing in the similar document retrieving system according to the fourth embodiment of the invention.

In the following, description will be directed to the document registration processing in the similar document retrieving system according to the instant embodiment of the invention by reference to FIG. 20. FIG. 20 shows a flow of processings in the case where the document #3 "This article deals with retrieval of an aimed document . . . " and the document #4 "This article deals with . . . for inputted document . . . Diese Abhandlung zeigt wie die Dokumenten zu suchen" are registered in the document database, as in the case of the document registration processing (FIG. 12) described hereinbefore in conjunction with the third embodiment of the invention. At this juncture, it should be mentioned that the processing procedure shown in FIG. 20 differs from that shown in FIG. 12 in that after execution of the registration-subjected document acquisition processing 120, the integrated statistical information collection/registration processing 1600 is executed.

In the integrated statistical information collection/registration processing 1600, the statistical information for the registration-subjected documents #3 and #4 is collected. In the case of the example illustrated in FIG. 20, information "registration-subjected document number: 2" is collected as the integrated statistical information 2000. The integrated statistical information 2000 (the number of the registration-subjected documents) created through the above processing is added to the statistical information 2001 concerning the already registered documents, whereby new statistical information 2002 is outputted. Parenthetically, this new information is stored in the form of the integrated statistical information file 1601. The above is the gist of the document registration processing procedure in the similar document retrieving system according to the fourth embodiment of the invention.

Figure 21:
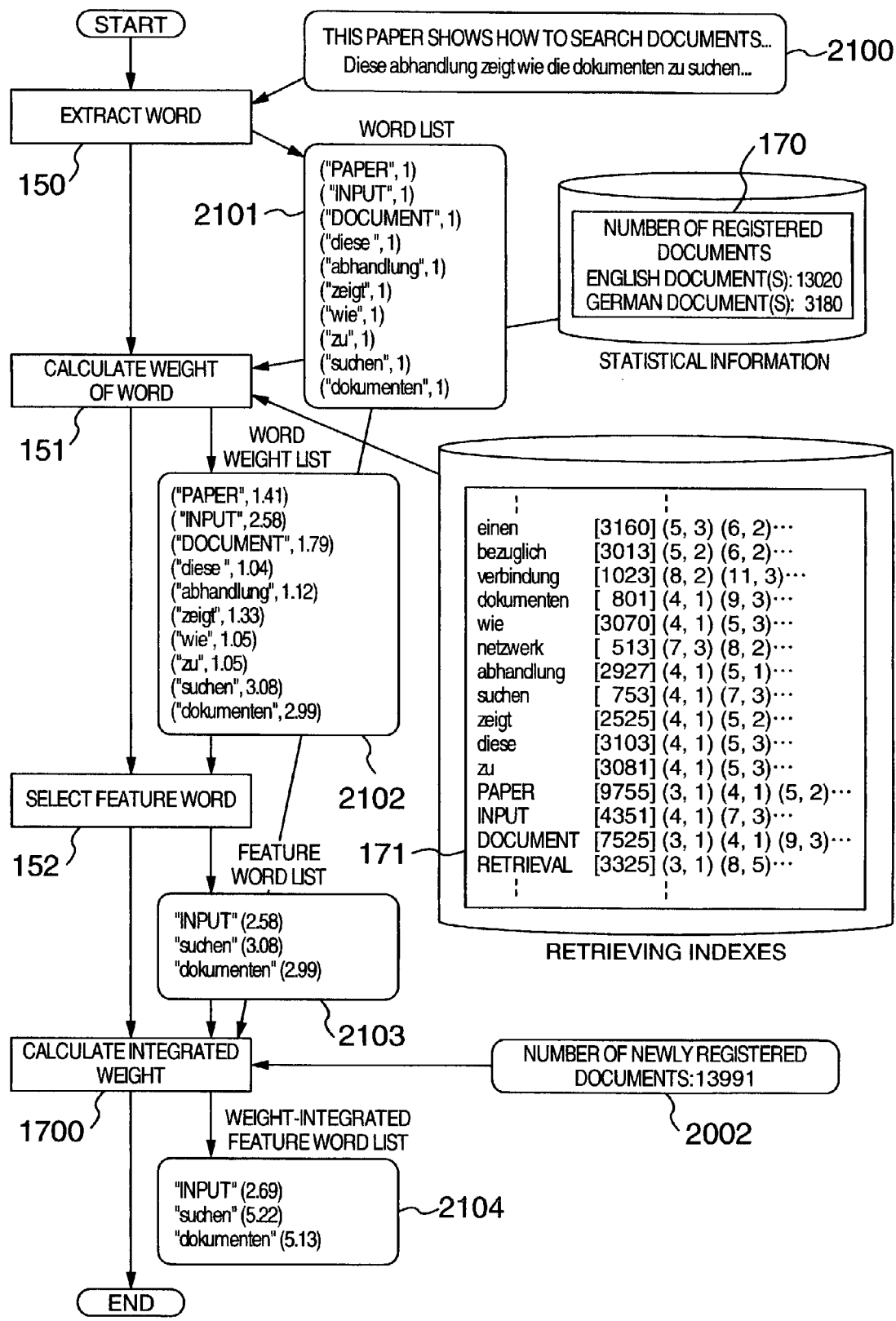
FIG. 21 is a flow chart for illustrating generally a feature word extraction processing in the similar document retrieving system according to the fourth embodiment of the invention.

Next, referring to FIG. 21, description will turn to the processing procedure of the feature word extraction program 131*a* in the similar document retrieving system now under consideration on the presumption that a query document 2100 "'This article deals with . . . for inputted document . . . Diese Abhandlung zeigt wie die Dokumenten zu suchen' held on the work area 140 is inputted. At first, the word extraction processing 150 is executed, whereby words are extracted from the query document 2100 held in the work area 140 to be stored again in the work area 140 in the form of a word list 2101 "("article", 1), ("input", 1), ("document", 1) . . . ". As the method of extracting the words, consecutive character strings delimited by punctuations such as blank, comma and the like marks may be extracted as the words in the case where the character strings of the query document are English and German codes. On the other hand, in the case where the query document is written in Japanese code, the words are extracted from those contained in a word dictionary (not shown in FIG. 6).

Subsequently, the word weight calculation program 151 is executed for calculating the weights of the individual words contained in the word list 2101 by referencing the language-based statistical information file 170 and the retrieving indexes 171 created in the document registration processing. The results are then stored in the work area 140 as a word weight list 2102. In succession, the feature word selection processing 152 is executed. More specifically, the word weight list 2102 stored in the work area 140 with the word weight calculation program 151 mentioned above is read out or fetched, whereon the words whose weights meet the predetermined condition are extracted as the feature words to be subsequently stored in the work area 140 in the form of a feature word list 2103. In the case of the example now under consideration, it is assumed that the condition for extracting the feature words prescribes that the word whose weight is not smaller than "2.00" is to be extracted as the feature word. Consequently, the words "'input" (2.58)', "'suchen" (3.04)' and "'Dokumenten" (2.99)' are extracted as the feature words and then stored in the form of a weight-integrated feature word list 2104.

Subsequently, the integrated weight calculation program 1700 is executed. In this integrated weight calculation program, the integrated weights are calculated for all the words contained in the feature word list 2103 stored in the work area 140 through the feature word selection processing 152 in accordance with the expression (6) mentioned hereinbefore by referencing the word list 2101 and the new statistical information 2002. Results of this calculation are stored in the work area 140 as a weight-integrated feature word list 2104. In the case of the instant example, the integrated weight of the word "input" is calculated to be "'input" (2.69)' as can be seen from the undermentioned expression (7). Similarly, the integrated weights of "suchen" and "Dokumenten" are calculated as "'suchen" (5.22)' and "'Dokumenten" (5.13)' which are then stored in the weight-integrated feature word list 2104.

$$\text{integrated weight of "input"} = 1 + \log_2 13991/4351 = 2.69 \tag{7}$$

As can be seen from the above, the words "suchen" and "Dokumenten" are decided to be more important words than the word "input" in the document database and thus imparted with greater weights, respectively, as compared with the weight of the word "input". Incidentally, in the calculation of the integrated weight, the formula (6) mentioned hereinbefore is used. It should however be understood that any other appropriated weight calculating expression may be adopted substantially to the same effect. The above are the gist of the feature word extraction processing procedure in the similar document retrieving system according to the instant embodiment of the invention.

Finally, with the similarity degree calculation program 132 shown in FIG. 6, the integrated weights calculated through the integrated weight calculation processing are regarded as the weights of the feature words, respectively, to be used for calculating the degrees of similarity of the registered documents to the query document. By making use of the integrated weight, those documents stored in the document database whose contents bear closer similarity to that of the query document 2100 are outputted. Thus, the user can acquire the desired or target document by perusing the results of retrievals in the descending order. The foregoing are the concept of the present invention incarnated in the fourth embodiment thereof.

As is apparent from the foregoing description, the feature word extracted by using the language-based statistical information is assigned with the weight calculated by using the statistical information of the whole document database, whereon the resulting feature word is used for calculating the degree of similarity. Thus, with the concept of the invention incarnated in the instant embodiment, the similar document retrieval can be realized with high accuracy even when the query document is described in plural different languages regardless of deviation or difference in respect to the number of the registered documents in dependence on the species of languages in which the registered documents are written.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of retrieving a document from a database, comprising the steps of:
   extracting a plurality of words contained in a query document received;
   collecting a plurality of words contained in a plurality of documents, document names of the documents including any of said plurality of words, and an occurring number of words occurring in a document per a language of word registered previously in the database for thereby creating retrieving indexes on the basis of numbers of times said plural words as collected occur in said previously registered documents, respectively, said retrieving indexes being held in a memory;
   calculating a number of documents registered based on a number of words occurring in a document to obtain weights of said plural words, respectively, acquired in said extracting step through comparison with the words included in said retrieving indexes;
   selecting a plurality of words on the basis of weight values of said plural words as the condition for selection;
   calculating degrees of similarity of said plural documents by summing products of the weights and the occurring number of the words registered previously to said query document on the basis of said plurality of selected words; and
   outputting a result of said degrees of similarity calculated.

2. A document retrieving method according to claim 1, further comprising a step of:
   extracting a predetermined number of words of greater weight for selecting said plural words.

3. A document retrieving method according to claim 1, further comprising a step of:
   excluding words of less significance for selecting said plural words.

4. A document retrieving method according to claim 3, further comprising a step of:
   selecting a plurality of words contained in said previously registered documents on a per-language basis for creating said retrieving indexes.

5. A document retrieving method according to claim 2, further comprising a step of:
   selecting a plurality of words contained in said previously registered documents on a per-language basis for creating said retrieving indexes.

6. An apparatus comprising a storage medium containing a document retrieving program stored therein, the program composed of computer-readable codes together designed to run on a document retrieving system containing said storage medium in which said program is read and installed, the program when executed causing the document retrieving system to perform:
   extracting a plurality of words contained in a query document received;
   collecting a plurality of words contained in a plurality of documents, document names of the documents including any of said plurality of words, and an occurring number of words occurring in a document per a language of word registered previously in a database for thereby creating retrieving indexes on the basis of numbers of times said plural words as collected occur in said previously registered documents, respectively, said retrieving indexes being held in a memory;
   calculating a number of documents registered based on a number of words occurring in a document to obtain respective weights of said plural words acquired in said extracting step through comparison with the words included in said retrieving indexes;
   selecting a plurality of words on the basis of weight values of said plural words as the condition for selection;
   calculating degrees of similarity of said plural documents by summing products of the weights and the occurring number of the words registered previously to said query document on the basis of said plurality of selected words; and
   outputting a result of said degrees of similarity calculated.

7. A document retrieving entity according to claim 6, further comprising a step of:
   extracting a predetermined number of words of greater weight for selecting said plural words.

8. A document retrieving entity according to claim 6, further comprising a step of:
   excluding words of less significance for selecting said plural words.

9. A document retrieving entity according to claim 8, further comprising a step of:
   selecting a plurality of words contained in said previously registered documents on a per-language basis for creating said retrieving indexes.

10. A document retrieving entity according to claim 7, further comprising a step of:
    selecting a plurality of words contained in said previously registered documents on a per-language basis for creating said retrieving indexes.

11. A system for retrieving a document from a database, comprising:
- selector means for extracting a plurality of words contained in a query document received;
- collector for collecting a plurality of words contained in a plurality of documents, document names of the documents including any of said plurality of words, and an occurring number of words occurring in a document per a language of word registered previously in the database for thereby creating retrieving indexes on the basis of numbers of times said plural words as collected occur in said previously registered documents, respectively, said retrieving indexes being held in a memory;
- calculator for calculating a number of documents registered based on number of words occurring in a document to obtain respective weights of said plural words acquired by said selector through comparison with the words included in said retrieving indexes;
- another selector for selecting a plurality of words on the basis of weight values of said plural words as the condition for selection;
- another calculator for calculating degrees of similarity of said plural documents by summing product of the weight and the occurring number of the words registered previously to said query document on the basis of said plurality of selected words; and means for outputting a result of said degrees of similarity calculated.

12. A document retrieving system according to claim 11, wherein a predetermined number of words of greater weight are extracted for selecting said plural words.

13. A document retrieving system according to claim 11, wherein words of less significance are excluded for selecting said plural words.

14. A document retrieving system according to claim 13, wherein a plurality of words contained in said previously registered documents are selected on a per-language basis for creating said retrieving indexes.

15. A document retrieving system according to claim 12, wherein a plurality of words contained in said previously registered documents are selected on a per-language basis for creating said retrieving indexes.

16. A similar document retrieving method for retrieving documents bearing similarity to a designated query document by using a computer, comprising the steps of:
- collecting statistical information concerning retrieval-subjected documents on a per-language basis upon registration thereof, said information including a plurality of words contained in a plurality of documents, document names of the documents including any of said plurality of words, and an occurring number of words occurring in a document per a language of word;
- extracting words from said query document to thereby calculate degrees of importance of the extracted words by referencing said per-language statistical information in dependence on the languages of said extracted words, respectively; and
- calculating a number of documents registered based on a number of words occurring in a document to obtain weights of the words and summing products of the weights and the occurring number of the words as the degrees of similarity of said registered documents to said query document on the basis of said calculated degrees of importance of the words.

17. A similar document retrieving method according to claim 16, wherein numbers of documents registered on a per-language basis are employed as said per-language statistical information collected upon registration of the documents.

18. A similar document retrieving method according to claim 16, wherein the word whose degree of importance meets a predetermined condition is selected as a feature word representing a feature of a query document concerned, and wherein the degree of importance of the feature word is calculated on the basis of said feature word and statistical information of all the registration-subjected documents collected upon registration thereof.

19. A similar document retrieving method according to claim 18, wherein said predetermined condition prescribes that the degree of importance of said word is not smaller than a predetermined value.

20. A similar document retrieving method according to claim 18. wherein said predetermined condition prescribes that a predetermined number of words are extracted in a descending order of the importance degrees of the words.

21. A similar document retrieving method according to claim 18, wherein the feature words are selected on a per-language basis.

22. A similar document retrieving method according to claim 16, wherein the per-language statistical information of said registration-subjected documents is stored on a per-language basis.

* * * * *